US005740235A

United States Patent [19]

Lester et al.

[11] Patent Number: 5,740,235

[45] Date of Patent: Apr. 14, 1998

[54] USER-PROGRAMMABLE PAGING SYSTEM CONTROLLER HAVING PRIORITY-BASED, MULTIPLE INPUT PAGING ACCESS CAPABILITY FOR SELECTIVELY ACTIVATING ONE OR MORE AUDIO/ VISUAL PAGING OUTPUT DEVICES

[75] Inventors: James William Lester, Ventura; Terri Runyan Shafer, Camarillo, both of Calif.; Dennis Carl Chimienti, Snohomish, Wash.; Randall Mark Wagner, Thousand Oaks, Calif.

[73] Assignee: Harris Corporation, Melbourne, Fla.

[21] Appl. No.: 194,363

[22] Filed: Feb. 9, 1994

[51] Int. Cl.[6] .............................. H04M 1/60; H04Q 1/30; G08B 5/22

[52] U.S. Cl. .......................... 379/170; 379/171; 379/172; 340/825.37; 340/825.44; 340/311.1

[58] Field of Search ............................... 379/56, 57, 170, 379/171, 172; 340/825.44, 825.37, 825.38, 311.1, 313; 455/31.2, 31.3, 458, 426, 556

[56] References Cited

U.S. PATENT DOCUMENTS

| | | | |
|---|---|---|---|
| 4,380,004 | 4/1983 | Coats et al. | 340/32 |
| 4,459,434 | 7/1984 | Benning | 379/170 |
| 4,882,729 | 11/1989 | Lobel | 370/85.1 |
| 4,904,992 | 2/1990 | Grothouse | 340/825.44 |
| 5,033,080 | 7/1991 | Deane | 379/170 |
| 5,095,307 | 3/1992 | Shimura | 340/825.44 |
| 5,131,048 | 7/1992 | Farenelli | 379/170 |
| 5,144,648 | 9/1992 | Bhagat | 340/825.44 |
| 5,363,434 | 11/1994 | Farenelli et al. | 379/171 |
| 5,426,426 | 6/1995 | Hymel | 340/825.44 |
| 5,506,886 | 4/1996 | Maine | 379/57 |
| 5,535,257 | 7/1996 | Goldberg | 379/57 |

FOREIGN PATENT DOCUMENTS

WO/92/03891 3/1992 WIPO .

*Primary Examiner*—Wing F. Chan
*Assistant Examiner*—Vijay Shankar
*Attorney, Agent, or Firm*—Charles E. Wands

[57] ABSTRACT

A paging system controller is accessible from a plurality of input devices, such as an attendant's position, a telephone interface, telephone night bell, programmable switch devices and digital data communications devices, and is user-programmable to respond to signalling activity sourced from such accessing devices to establish a paging connection to and perform prescribed audio/visual output paging signal functions with respect to one or a plurality of paging zones served by the system. The output paging signal functions include the transmission of audio tone and voice paging signals via an audio signal path from a paging source to one or more controllably energized paging loudspeaker amplifiers, the generation of one or more alert tones to a paging zone, talkback audio signalling from the paging zone to a telephone interface, the playback of prerecorded (audio/visual) messages from either or both of audio output (e.g. loudspeaker) and visual output (e.g. silent radio) devices. Respective access inputs to which the paging system controller responds are given user-programmable priorities of access permission, with a higher priority access input always being given preference over a lower priority access input. A programmable access priority table, which may be customized by the user to assign respectively different access priority levels to respectively different classes or types of input access is stored in memory employed by the control system's processor.

49 Claims, 13 Drawing Sheets

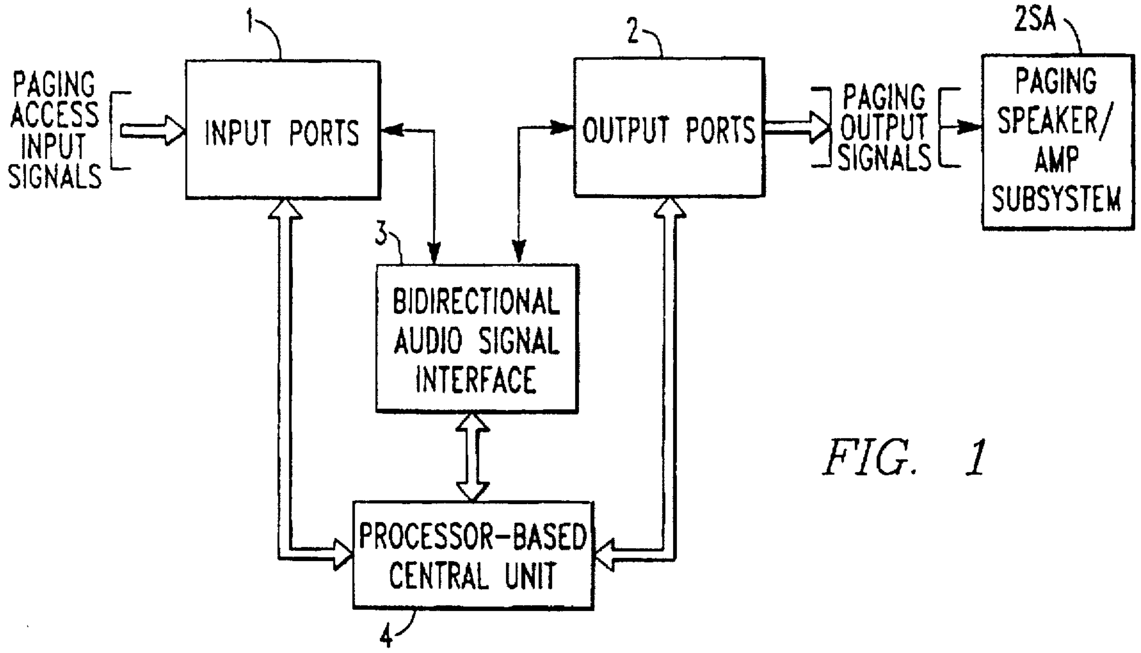
FIG. 1
FIG. 3
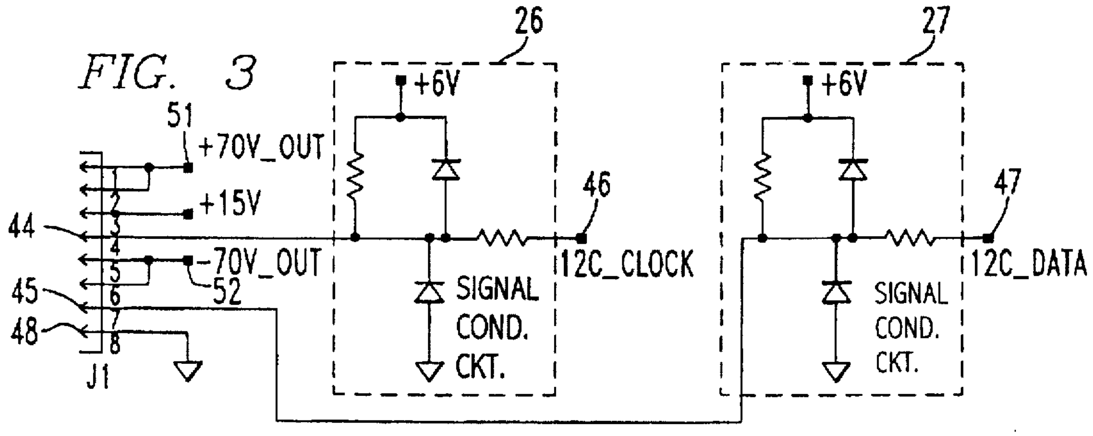
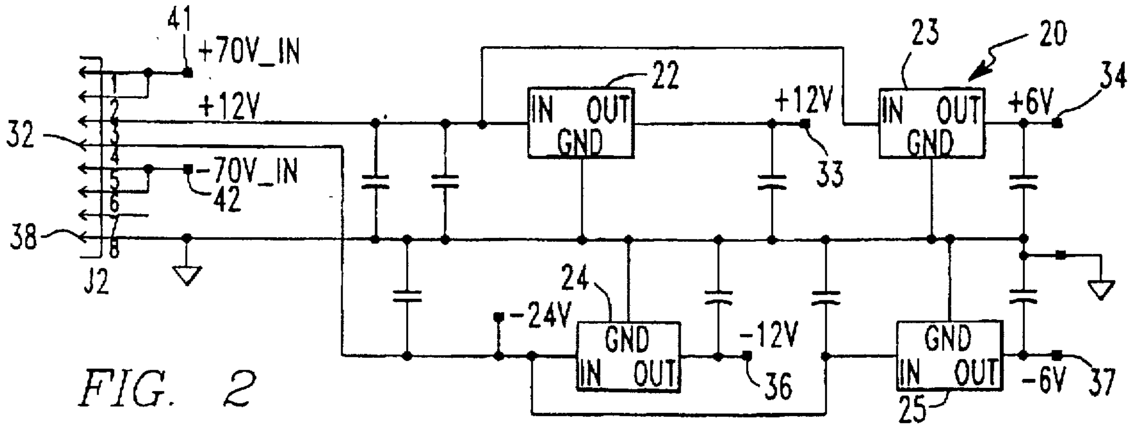
FIG. 2

| TYPE | FUNCTION | SCH SIG NAME | DESCRIPTION | PIN/PORT | DEVICE |
|---|---|---|---|---|---|
| INPUT | ATTENDANT ACCESS | AA_DET | ACTIVE HIGH, 50 MSEC DEBOUNCE, ENABLES AA MODE. | P2.0 | NODE 75 FIG. 4A |
| INPUT | LOOP CURRENT | LOOP_DET | ACTIVE LOW, 150 MSEC DEBOUNCE IN LS/GS MODE, 1.2 SEC IN STATION MODE. | P1.5 | NODE 443 FIG. 4A |
| INPUT | DRY LOOP | DL_DET | ACTIVE HIGH, 50 MSEC DEBOUNCE, ENABLES T/R AUDIO/TONE. | P2.1 | NODE 406 FIG. 4A |
| INPUT | RING DETECT | RING_DET | ACTIVE 17-63 HZ. RING, ONCE QUALIFIED LOOP_EN IS ENABLED AND LOOP_DET HAS THE 1.2 SEC DEBOUNCE. | P1.6 | NODE 438 FIG. 4A |
| INPUT | DTMF VALID | DTMF_VAL | ACTIVE HIGH AFTER DTMP DECODER HAS QUALIFIED THE DTMF, AFTER DEBOUNCE AND CHECK FOR ORIGINATION, P1.0-P1.3 IS READ. | P1.4 | LINE 155 FIG. 6A |
| INPUT | DTMF Q1 | DTMF_1 | | P1.0 | LINE 151 FIG. 6A |
| INPUT | DTMF Q2 | DTMF_2 | | P1.1 | LINE 152 FIG. 6A |
| INPUT | DTMF Q3 | DTMF_3 | | P1.2 | LINE 153 FIG. 6A |
| INPUT | DTMF Q4 | DTMF_4 | | P1.3 | LINE 154 FIG. 6A |
| INPUT | PAGE DETECT | PAGE_DET | ACTIVE LOW, WHEN ACTIVE CANGES FROM TALK-BACK TO PAGE, AFTER 300MS OF LOGIC 1 CHANGES FROM PAGE TO TALK-BACK. | P1.7 | NODE 129 FIG. 5A |
| INPUT | NIGHT BELL RING DETECT | NIGHT_BELL | ACTIVE 17-63 HZ. RING, ONCE QUALIFIED, NIGHT BELL TONE SENT TO AUDIO OUTPUT. | P3.3 | LINE 817 FIG. 6A |
| INPUT | VOICE ACTIVE SWITCH | VOX_DET | ACTIVE WITH REPETIVE SIGNAL. | P3.2 (INTO) | NODE 79 FIG. 4B |
| INPUT | ZONE 1 INPUT | ZONE1_IN | ACTIVE HIGH. | P0.0 | 173 FIG. 6B |
| INPUT | ZONE 2 INPUT | ZONE2_N | ACTIVE HIGH. | P0.1 | 173 FIG. 6B |

*FIG. 9*

| | | | | | |
|---|---|---|---|---|---|
| INPUT | ZONE 3 INPUT | ZONE3_IN | ACTIVE HIGH | P0.2 | 173 FIG. 6B |
| INPUT | ZONE 4 INPUT | ZONE4_IN | ACTIVE HIGH | P0.3 | 173 FIG. 6B |
| INPUT | ZONE 5 INPUT | ZONE5_IN | ACTIVE HIGH | P0.4 | 173 FIG. 6B |
| INPUT | ZONE 6 INPUT | ZONE6_IN | ACTIVE HIGH | P0.5 | 173 FIG. 6B |
| INPUT | ZONE 7 INPUT | ZONE7_IN | ACTIVE HIGH | P0.6 | 173 FIG. 6B |
| INPUT | ZONE 8 INPUT | ZONE8_IN | ACTIVE HIGH | P0.7 | 173 FIG. 6B |
| INPUT | RS232 RECEIVE | RS232_R | | P3.0 | NODE 816 FIG. 6B |
| BI-DIRECTIONAL | $I^2C$ DATA | I2C_DATA | | P3.4 | 200B FIG. 6B |
| OUTPUT | $I^2C$ CLOCK | I2C_CLOCK | | P3.5 | 200B FIG. 6B |
| OUTPUT | RS232 TRANSMIT | RS232_X | | P3.1 | NODE 815 FIG. 6B |
| OUTPUT | ZONE 1 OUTPUT | ZONE1OUT | ENABLES ZONE 1 WHEN HIGH AND 181 IS ALSO HIGH | P0.0 | 171 FIG. 6B |
| OUTPUT | ZONE 2 OUTPUT | ZONE2OUT | ENABLES ZONE 2 WHEN HIGH AND 181 IS ALSO HIGH | P0.1 | 171 FIG. 6B |
| OUTPUT | ZONE 3 OUTPUT | ZONE3OUT | ENABLES ZONE 3 WHEN HIGH AND 181 IS ALSO HIGH | P0.2 | 171 FIG. 6B |
| OUTPUT | ZONE 4 OUTPUT | ZONE4OUT | ENABLES ZONE 4 WHEN HIGH AND 181 IS ALSO HIGH | P0.3 | 171 FIG. 6B |
| OUTPUT | ZONE 5 OUTPUT | ZONE5OUT | ENABLES ZONE 5 WHEN HIGH AND 181 IS ALSO HIGH | P0.4 | 171 FIG. 6B |
| OUTPUT | ZONE 6 OUTPUT | ZONE6OUT | ENABLES ZONE 6 WHEN HIGH AND 181 IS ALSO HIGH | P0.5 | 171 FIG. 6B |
| OUTPUT | ZONE 7 OUTPUT | ZONE7OUT | ENABLES ZONE 7 WHEN HIGH AND 181 IS ALSO HIGH | P0.6 | 171 FIG. 6B |
| OUTPUT | ZONE 8 OUTPUT | ZONE8OUT | ENABLES ZONE 8 WHEN HIGH AND 181 IS ALSO HIGH | P0.7 | 171 FIG. 6B |

*FIG. 10*

| | | | | | |
|---|---|---|---|---|---|
| OUTPUT | PAGE/TALKBACK RELAY | P/TB_RLY | LOGIC 0, ZONE IN PAGE/ MUSIC MODE. LOGIC 1, ZONE IN TALK-BACK MODE. ENBALED WHEN 182 IS HIGH. | P0.0 | NODE 739 FIG. 5B |
| OUTPUT | LOOP SUPERVISION RELAY | LOOP_EN | ENABLES THE LOOP RELAY IN THE STATION MODE, AFTER RING IS QUALIFIED. ENABLED WHEN 182 IS ALSO HIGH. | P0.1 | NODE 441 FIG. 4A |
| OUTPUT | MPS (CONDOR AMP) | AMP_MPS | ACTIVE HIGH WHEN AN OUTPUT ZONE HAS BEEN SELECTED. ENABLED WHEN 182 IS ALSO HIGH. | P0.2 | NODE 138 FIG. 5B |
| OUTPUT | PAGE AMPLIFIER DISABLE | AMP_CD | LOGIC 0 ENABLES U14. LOGIC 1 DISABLES U14. ENABLED WHEN EN 182 IS ALSO HIGH. | P0.5 | NODE 122 FIG. 5B |
| OUTPUT | TALK-BACK MUTE | TB_MUTE | LOGIC 0 MUTES TALK-BACK AUDIO. ENABLED WHEN 182 IS ALSO HIGH. | P0.4 | NODE 115 FIG. 5A |
| OUTPUT | TONE ONE | TONE_1 | GENERATES TONES | P3.6 | NODE 701 FIG. 4B |
| OUTPUT | TONE TWO | TONE_2 | GENERATES TONES | P3.7 | NODE 702 FIG. 4B |
| OUTPUT | WATCHDOG | | ENABLED WHEN 182 IS HIGH. | P0.3 | 210 FIG. 5A |
| OUTPUT | T/R TONE OR TALK-BACK AUDIO | MUX | LOGIC 0 ALLOWS TALK-BACK AUDIO TO BE PASSED TO T/R. LOGIC 1 ALLOWS TONE TO BE PASSED TO T/R. | P2.5 | NODES 88, 198 FIG. 4B NODE 108 FIG. 5A |
| OUTPUT | T/R OR ATTENDANT ACCESS PAGE AUDIO | MUX | LOGIC 0 SELECTS AA AUDIO INPUT. LOGIC 1 SELECTS T/R AUDIO INPUT. | P2.6 | NODES 87, 197 FIG. 4B NODE 107 FIG. 5A |
| OUTPUT | PAGE TONE OR PAGE AUDIO ENABLE | MUX | LOGIC 0 SELECT PAGE TONE. LOGIC 1 SELECTS PAGE AUDIO. | P2.7 | NODES 86, 196 FIG. 4B NODE 106 FIG. 5A |

*FIG. 11*

| | | | | | |
|---|---|---|---|---|---|
| OUTPUT | ENABLE DRIVER 171 | | LOGIC 1 WILL LATCH DATA ON P0.0-P0.7 TO THE OUTPUT | P2.3 | LINE 181 FIG. 6B |
| OUTPUT | ENABLE DRIVER 172 | | LOGIC 1 WILL LATCH DATA ON P0.0-P0.7 TO THE OUTPUT. | P2.4 | LINE 182 FIG. 6B |
| OUTPUT | ENABLE DRIVER 173 | | LOGIC 1 WILL ENABLE 173 DATA ON P0.0-P0.7 WILL BE READ BY THE MICRO. | P2.2 | LINE 183 FIG. 6B |
| OUTPUT | ENABLE OFF-HOOK LED | $\overline{\text{LED\_OH}}$ | ACTIVE HIGH, ENABLED AFTER LOOP_DET OR DL_DET HAS BEEN DEBOUNCED. ENABLED WHEN 182 IS ALSO HIGH. | P0.6 | LED 448 FIG. 6B |
| OUTPUT | ENABLE ATTENDANT ACCESS LED | $\overline{\text{LED\_AA}}$ | ACTIVE HIGH, ENABLED AFTER AA_DET HAS BEEN DE-BOUNCED. ENABLED WHEN 182 IS ALSO HIGH. | P0.7 | LED 76 FIG. 6B |

*FIG. 12*

USER-PROGRAMMABLE PAGING SYSTEM CONTROLLER HAVING PRIORITY-BASED, MULTIPLE INPUT PAGING ACCESS CAPABILITY FOR SELECTIVELY ACTIVATING ONE OR MORE AUDIO/VISUAL PAGING OUTPUT DEVICES

FIELD OF THE INVENTION

The present invention relates in general to paging systems, and is particularly directed to a paging system controller which is accessible from a plurality of input devices, such as an attendant's position, a telephone interface, telephone night bell, programmable switch devices and digital data communications devices, and is programmed to respond to paging request activity sourced from such accessing devices, and to establish a paging connection to and perform prescribed audio/visual output paging signal functions with respect to one or more paging zones served by the system.

BACKGROUND OF THE INVENTION

Paging systems have historically involved real time audio paging in (relatively low background noise) office environments, and the generation of digitized voice messages (typically scrolled across a pixel matrix display) in high ambient noise environments, such as an industrial production line facility. In order to provide emergency information, various types of warning devices have been installed in such environments for emitting alert tones (sirens) or prerecorded ('canned') messages over the paging system. A fundamental shortcoming of such conventional paging systems has been their inability to provide either adequate normal paging or emergency information to the variety of personnel who can be expected to be present in both low noise and high noise environment, particularly now that the 1990 Americans with Disabilities Act (ADA) requires most office and industrial facilities to provide access and freedom of movement to physically impaired individuals. Although the ADA effectively mandates the freedom of access and movement to all individuals, it does not address the need for visual messaging for either standard or emergency page announcements for the hearing-impaired, or audible page announcements for the visually impaired.

SUMMARY OF THE INVENTION

In accordance with the present invention, such shortcomings of conventional paging systems and their associated control mechanisms are remedied by a new and improved paging system controller, which is accessible from a plurality of input devices, such as an attendant's position, a telephone interface, telephone night bell, programmable switch devices and digital data communications devices, and is user-programmable to respond to signalling activity sourced from such accessing devices to establish a paging connection to and perform prescribed audio/visual output paging signal functions with respect to one or a plurality of paging zones served by the system.

The output paging signal functions include, but are not limited to, the transmission of audio tone and voice paging signals via an audio signal path from a paging source to one or more (controllably energized) paging loudspeaker amplifiers, the generation of one or more alert tones to a paging zone, talkback audio signalling from the paging zone to a telephone interface, the playback of prerecorded (audio/visual) messages from either or both of audio output (e.g. loudspeaker) and visual output (e.g. silent radio) devices.

Since the paging system controller of the present invention is accessible from a plurality of inputs and is programmable to provide single or multiple output signalling capability, the respective access inputs to which it responds are given user-programmable priorities of access permission, with a higher priority access input always being given preference over a lower priority access input. A programmable access priority table, which may be customized by the user to assign respectively different access priority levels to respectively different classes or types of input access is stored in memory employed by the control system's processor.

As a non-limiting example, the highest priority level may be associated with access by an attendant. A second level of access priority may be assigned to a first set of paging zone switch inputs, while telephone interface access may be assigned to a third highest priority level. A second set of paging zone switch inputs may be given a fourth highest priority level, and a night bell given a fifth highest priority level. In the absence of an access input from any of these priority levels, the controller may default to a prescribed signal source, such as music or news broadcast, for providing 'background' audio to the paging zones served by the system.

The paging system controller draws its power from a separate amplifier subsystem associated with the audio speakers of the paging system, by means of a power interface unit containing DC—DC converter circuitry, which converts voltage outputs provided by a paging speaker amplifier subsystem and translates these voltages to values required by the components of the controller. The drive voltage for operating paging speaker amplifiers is controllably switched, under supervisory processor control, to whatever zone output device is to generate a paging/tone output.

For attendant access, audio/paging signals, such as may be sourced from an operator's headset microphone of an accessing attendant's position, are coupled via an input connector to an controlled audio signal path through which tones and audio signals are conveyed. The input connector also has an attendant access control port through which a supervisory microcontroller may be advised of the occurrence of an attendant connection. The supervisory microcontroller has a plurality of input/output ports and is operative to execute a user-programmed paging system signal processing routine resident in attendant operating system memory.

Upon an attendant connection, the processor sets the signal path states of respective components of the system, including multiplexer steering paths, to provide control and audio signal paths from the accessing attendant to one or more designated output devices. The attendant's audio signal path is coupled to an initial steering multiplexer which is operative to receive both telephone interface signals and page signals from the attendant, and serves to couple its output via a page/DTMF signal path to an automatic gain control (AGC) circuit.

The output of the AGC circuit and the output of a tone summing circuit are coupled through audio signal path multiplexer circuitry to an output audio amplifier stage, which drives a set of output ports to which amplifier circuitry of the paging amplifier subsystem may be coupled. Since the control system of the present invention serves as a supervisory routing interface between one or more paging input signal sources and one or more associated output devices, such as audio speakers or visual display units, the output audio amplifier stage is not intended to serve as a direct input drive the speaker subsystem. Instead, it provides preliminary amplification of audio/tone signals provided over the audio signal path for application to one or more output audio signalling devices driven by the attendant paging amplifier driver units.

As will be described, signals multiplexed onto the path/DTMF path from a telephone interface are also processed by a precision rectifier circuit, which provides a rectified (DC) voltage representative of the audio (voice) level, the DC voltage being coupled to a first input of a page/talkback threshold detection circuit. The page/talkback detection circuit compares this DC level with an adaptive (to paging zone noise/background) threshold value and controls the logic level at its page detection output, in dependence upon whether or not the signal level of the audio signal path as rectified into a DC voltage by precision rectifier exceeds the adaptive reference threshold. The page/talkback threshold detection circuit serves to allow a page audio signal from a telephone interface to override a talkback audio signal supplied from a telephone interface input or a speaker. A MOSFET switch is to the rectified audio DC input of the page/talkback detector and is operative to disable talkback in response to a microcontroller control signal. The AGC circuit further includes a controlled gain amplifier stage to which the audio signal is coupled.

As noted above, power for driving the paging amplifier units is controllably delivered to one or more of such amplifier units under processor control. Namely, the audio signals are routed to respective paging zone speaker amplifiers, which, in turn, are controllably powered by zone switch units, so that in the course of routing the audio/tone signals to zone speaker stages, +/−70 VAC ports of zone switches are enabled to supply the power inputs necessary for operation of the speaker amplifier stages. Output ports driven by an output audio amplifier stage include a plurality of ports respectively connected to the speaker amplifier subsystem, an audio signal output jack, and a remote amplifier unit. The speaker of a remote unit may serve as a bidirectional audio transducer, sourcing talk-back audio signals from a paging zone speaker.

The audio signal path is also coupled to a dual tone multifrequency signal (DTMF) decoder, outputs of which are monitored by the supervisory microcontroller for paging zone identification. The microcontroller has a set of bidirectional data ports, which are coupled via a system digital data bus to respective data inputs of each of a pair of multi-port latching output driver units, and to respective data outputs of a multi-port input buffer driver unit.

The output latching driver units include zone-associated output ports coupled to respective relay driver inputs of presettable zone switch units, and output ports which provide respective control signals that are routed to various circuit components within the system. A multi-port input buffer driver unit has a set of zone input ports to which outputs of the presettable zone switch units are coupled. The zone switch units are user programmable to couple power to zone speaker amplifiers, or operate as (switch closure-defined) input/output devices.

When an attendant accesses the control system, the attendant may instruct the microcontroller to assert output signals via a specified one or more of output zone ports, so that the attendant may supply a real time audio page through an associated loudspeaker. The page may also be coupled to one or more specified amplified speakers or a specified group of speakers. The accessing attendant may also instruct the processor to assert an output on one or more of the user programmable switch units, so that the attendant may controllably activate a zone utility device, such as an alerting strobe light or prerecorded visual and/or message the operation of which is responsive to the closure of the zone switch contacts.

In addition, through DTMF signalling or through a serial data communications interface (e.g. RS-232 port) the attendant may instruct the microcontroller to transmit a preprogrammed (audio/visual) page signalling protocol to one or more virtual digital port addresses distributed on an associated data communications bus. Any device addressed either individually or globally by this protocol will respond by generating a prescribed prerecorded audio/visual message.

Input type (1 and 2) accesses are effected through one or more zone switch inputs, the operation of which cause the controller to initiate paging operations which the user has predetermined to be second in importance to only attendant access. Since the paging functionality is user-defined and user-prioritized, it is effectively a customized feature that the user programs, both in terms of input/output device and the effect of its operation (e.g. the activation of a push-button switch as a zone input signal, for the purpose of initiating the playback of a prerecorded audio/video message in one or more paging zones). The priority assigned to any zone switch is stored in the paging routine's priority table. The microcontroller polls the multi-port input driver to determine if either type of input has been asserted. If an asserted zone input is detected, the microcontroller examines the stored priority table to determine the priority level of the asserted input.

The action taken in response to detecting an asserted input type access is based upon a preprogrammed response routine stored in memory and will involve the assertion of one or more zone output signals to one or more respective data inputs of the multi-port latching output driver unit, to which respective relay driver inputs associated with a plurality of presettable zone switch units are coupled. Since a zone switch provides a circuit path connection to an output device, a zone switch may be employed as an on/off switch for an audio or video device, such as the activating of a prerecorded announcement playback device through one or more paging speakers, or the activation of visual display playback unit to drive a message display device, such as a silent radio.

Thus, similar to an attendant access, through programming of the paging routine resident in processor memory, a zone switch input maybe employed to instruct the microcontroller to output prescribed alerting tone signals, which are coupled to a specified one or more of output zone ports, so that an input type-initiated alerting tone may be coupled to one or more specified amplified speakers or a specified group of speakers. The zone inputs may also be used to instruct the processor to assert an output on one or more of the switch units to controllably activate a zone utility device, such as a warning strobe light or prerecorded visual and/or message the operation of which is responsive to the closure of the zone switch contacts. Also, through programming, the processor may transmit a preprogrammed (audio/visual) page signalling protocol to one or more virtual digital port addresses distributed on an associated data communications bus. Any audio/visual output device addressed either individually or globally by this protocol will respond by generating a prescribed audio/visual message.

Additional functionality of the paging control system of the present invention is given to a calling party telephone access, and may include any one of four modes; 1) loop start; 2) ground start; 3) station; and 4) dry loop. Telephone interface access is by way of a modular jack having respective tip and ring terminals which are coupled to the tip and ring lines of a telephone line, a ground terminal which is coupled to system ground, and a dry loop terminal, which is coupled to a dry loop detection circuit. The jack ports are coupled through a user-presettable mode switch to a telephone interface signalling path. The telephone interface signalling path includes circuitry for controllably supplying talk battery and audio tone signalling.

The telephone interface signalling path is transformer coupled to bidirectional audio signalling path multiplexer and audio signal conditioning, amplification circuitry through which tone and voice signals are conveyed. This circuitry includes a control path through a further precision rectifier, coupled to the page/talkback detector, and whose parameters match those of the precision rectifier of the AGC circuit, in order to enable the page/talkback detector to accurately distinguish between page and talkback audio signals.

The audio signal path for the telephone interface includes a talkback amplitude compression circuit to which a talkback amplifier stage for receiving voice signals from the speaker of a remote unit are coupled, so that talkback signals may be conditioned for application to the telephone interface. A page/talkback relay is operative to controllably provide respective circuit paths from speaker port terminals to the talk-back signal amplifier.

The controller also provides for night bell access, through which a telephone ringing voltage is applied to a night bell ring sensing circuit, the output of which is monitored by the microcontroller. In the absence of any higher priority access input, the controller will service a night bell request in accordance with one or more of the programming options employed for each of the other access requests stored in processor memory.

Auxiliary serial data communications are effected via a serial data communications bus interface, so that the microcontroller may transmit a preprogrammed (audio/visual) page signalling protocol to one or more virtual digital port addresses distributed on an associated data communications bus. Any device, such as a silent radio, addressed either individually or globally by a protocol on the serial bus will respond by generating a prescribed audio/visual message.

The provision of a serial data communications bus port provides the controller with the capability to send a prescribed protocol message to one or more audio/visual devices distributed along the bus. In response to this message, any addressed device will generate a prerecorded message. Because protocol activity along the serial data communications bus is digitally sourced from the system's control processor, the actual presence of an output device is not required to exercise this option. Where a protocol message is transmitted from the microcontroller over the serial data bus in response to one of the access inputs described above, any device coupled to the bus whose address corresponds to that identified by the sourcing message will respond. If not, no message is generated for the addressed destination. This option permits one or more output devices to respond to such a protocol message. The output device addresses are therefore virtual rather than physical addresses, such a paging zones associated with the paging zones. To provide for multiple output responses to the same protocol message from the microcontroller, a plurality of output devices may be given the same virtual destination address, regardless whether such a zone exists.

When a paging zone is accessed from a calling party, as by supplying DTMF tones having a numerical code identity corresponding to a respective zone, the calling party must have knowledge of the zone number. In a facility such as a factory or office building, the need to have knowledge of zone numbers can be eliminated by the storing in memory a zone map which translates a multiple digit code (e.g. a three or four extension code or a four digit direct dial code) into the zone number in which the called party's telephone set is located. The microcontroller accesses the translating zone map in memory and outputs paging signals to the appropriate zone in which the called party is located. Thus, in an office environment, where plural office personnel are located in a given zone, the extension numbers of their respective desk phones are mapped to the same zone number of their shared zone. The calling party needs only know the extension number of the desk phone to effect a page.

To allow for the control system of the invention to be expanded to one or more zones beyond the zone capacity of the zone output latching driver stages, one or more zone expansion units, each of which contains plural zone switch units, may be connected in a daisy-chain interconnect configuration, via a zone expansion port coupled to a processor $I^2C$ bus. The zone expansion unit port includes digital signal conditioning circuits, which are operative to interface a digital signalling clock and digital data signals between addressed latching zone switching circuits of one or more zone expansion units, and clock and data portions of the $I^2C$ bus.

BRIEF DESCRIPTION OF THE DRAWINGS

FIG. 1 is a simplified block diagram illustration of a paging system controller in accordance with the present invention;

FIG. 2 schematically illustrates the circuit configuration of a power interface unit employed in the paging system controller of FIG. 1;

FIG. 3 schematically illustrates the circuit configuration of a zone expansion interface unit;

FIGS. 9–12 are a port assignment table associated with the operation of the page controller of FIG. 1.

DETAILED DESCRIPTION

Figure 4A:
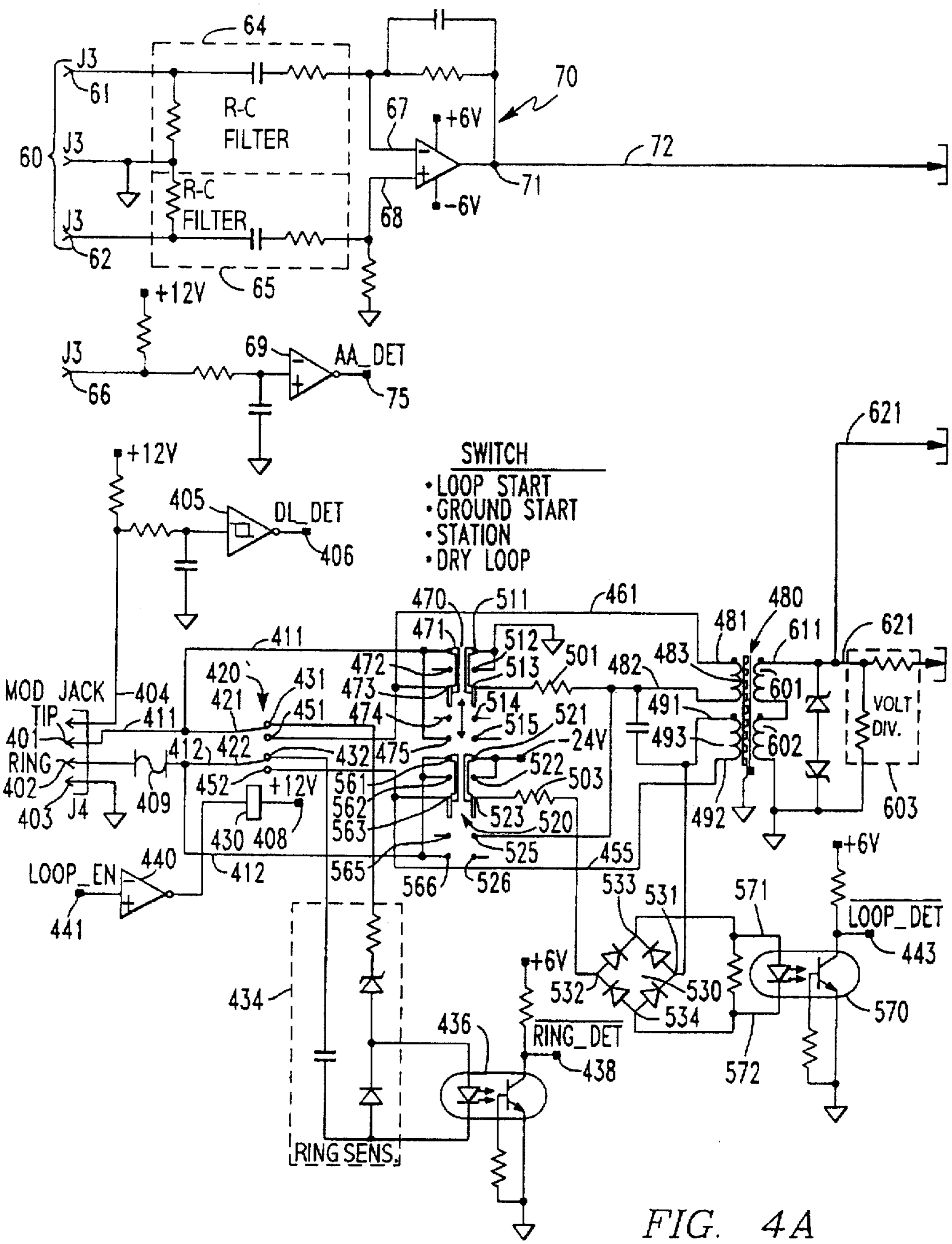
FIGS. 4A and 4B, taken together, schematically illustrate the circuit configurations of attendant access and telephone interface audio path signal processing circuits, and the tone generator circuitry employed in the bidirectional audio signal interface unit of FIG. 1.
Figure 4B:
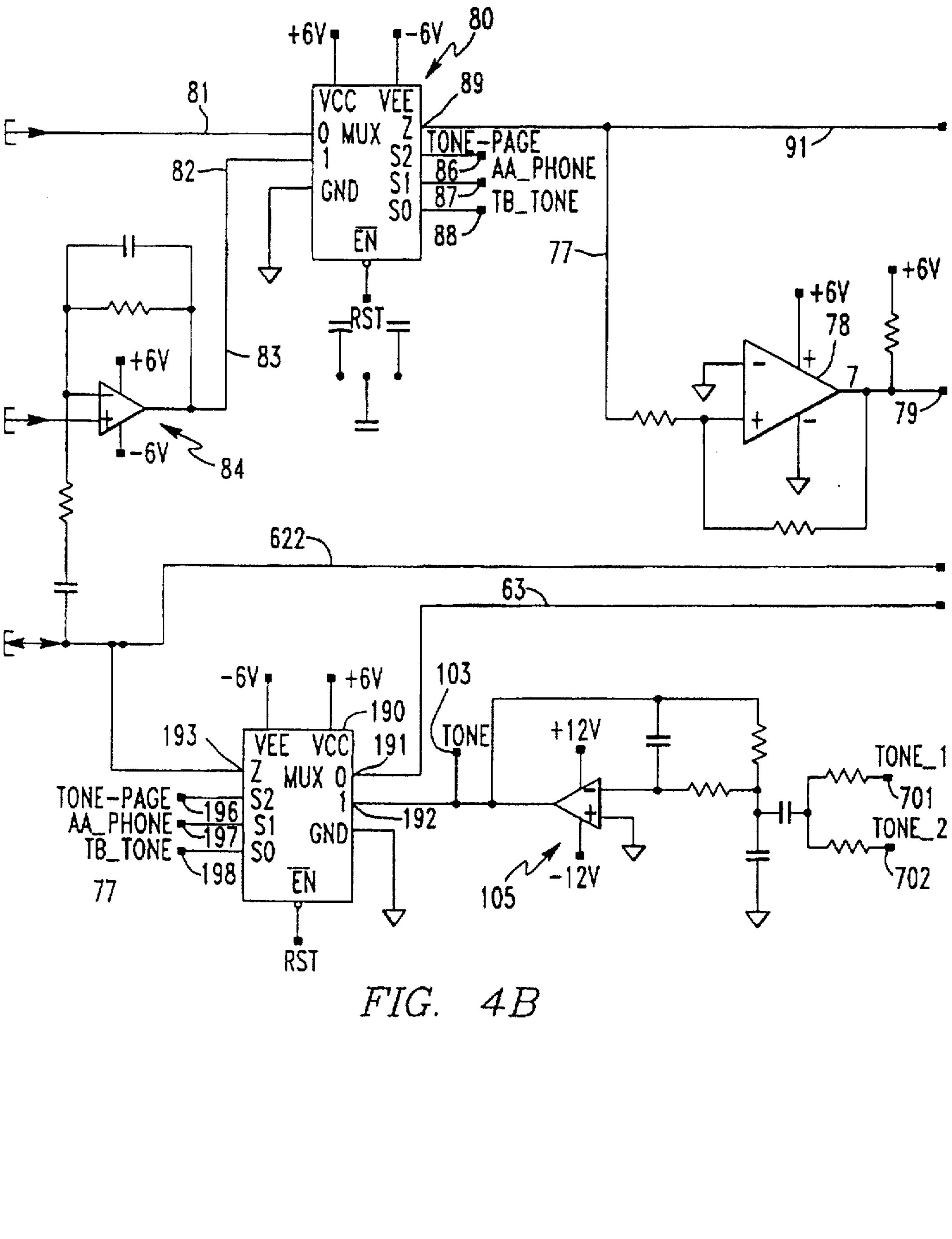

Before describing in detail the particular improved paging system controller architecture in accordance with the present invention, it should be observed that, for the most part, the present invention resides primarily in a novel structural combination of conventional signal processing and communication circuits and components and not in the particular detailed configurations thereof. Accordingly, the structure, control and arrangement of these conventional circuits and components have been illustrated in the drawings by readily understandable block diagrams which show only those specific details that are pertinent to the present invention, so as not to obscure the disclosure with structural details which will be readily apparent to those skilled in the art having the benefit of the description herein. Thus, the block diagram illustrations of the Figures do not necessarily represent the mechanical structural arrangement of the exemplary system, but are primarily intended to illustrate the major structural components of the system in a convenient functional grouping, whereby the present invention may be more readily understood.

Referring now to FIG. 1, the paging system controller in accordance with the present invention is diagrammatically illustrated as comprising a plurality of input ports 1, to which paging access input signals from plural types of input devices are supplied, and a plurality of output ports 2 from which paging output signals may be supplied to plural types of paging output devices. As will be described, the input ports 1 may include, but are not limited to, connection terminals from an attendant's position, a telephone interface, programmable switch devices and a digital data communications device, while the output ports may include, but are not limited to, connections to one or more prescribed audio/visual output paging signal devices, such as one or more paging loudspeakers, from which are provided audio paging messages and alert tones, talkback audio signalling from a paging zone to a telephone interface, and the playback of prerecorded audio/visual messages from either or both of audio output (loudspeaker) and visual output devices (silent radio message boards).

Coupled between the input ports 1 and output ports 2 is a bidirectional audio signal interface unit 3, which is operative to provide a page/tone signal path for page/tone signals source from input ports to audio paging output devices (of a paging speaker/amplifier subsystem 2SA) that are coupled to selected ones of the plurality of output ports, and to couple talkback and tone signals to selected input port connections. The bidirectional audio signal interface 3 is controlled by a supervisory processor-based control unit 4, which is operative to enable prescribed types of paging signals to be delivered to the output ports in accordance with paging access input signals supplied to the input ports.

The architecture and operation of the controller will be better understood with reference to FIGS. 4A–8, which diagrammatically illustrate the circuitry configuration of each of the input and output port connections, as well as the signal processing and conditioning circuitry contained within each of the bidirectional audio signal interface and its associated control unit.

As noted earlier, the paging system controller of the present invention draws its power from a separate amplifier subsystem associated with the audio speakers of the paging system. For this purpose, as shown in FIG. 2, the controller includes a power interface unit 20 comprised of DC—DC converter circuitry which is operative to receive prescribed voltages customarily provided by a paging speaker amplifier unit (e.g. +15 VDC and −24 VDC) and translates these voltages to values required by the components of the controller. As schematically illustrated in FIG. 2, the DC—DC converter circuitry includes respective DC—DC converters 22 and 23 which are coupled to a +15 VDC input pin 32 of a power supply jack J2 and provide respective voltages +12 VDC and +5 VDC at output terminals 33 and 34, respectively. Similarly, respective DC—DC converters 24 and 25 are coupled to a −24 VDC input pin 32 of power supply jack J2 and provide respective voltages −12 VDC and −5 VDC at output terminals 36 and 37, respectively. Ground (GND) is shown at jack pin 38, while +/−70 VAC for paging speaker audio amplifiers are coupled between terminals 41 and 42 and associated pins of power supply jack J2.

The controller also employs a zone expansion interface unit, shown in FIG. 3, which includes a pair of passive, digital signal conditioning circuits 26 and 27, which are respectively coupled to clock and data pins 44 and 45 of a zone expansion unit jack J1, and are operative to interface a digital signalling clock and digital data signals between addressed latching switching circuits of one or more zone expansion units, shown in FIGS. 8 and 9, to be described below, and clock and data terminals 46 and 47 which are coupled to an $I^2C$ bus associated with the controller's internal supervisory processor, as will be described. Ground (GND) is shown at jack pin 48, while +/−70 VAC for audio amplifier units employed by a zone expansion unit speaker system are coupled between terminals 51 and 52 and associated pins of zone expansion unit jack J1.

The circuitry configuration of the signal processing components of the bi-directional paging control system will now be described with reference to FIGS. 4A–6A. To facilitate the an understanding of the integration and functionality of the respective components of the invention, the respective signal processing capabilities of the system will be described in association with the respective classes of service performed by the controller. As noted earlier, because the paging system of the present invention is programmable and provides for both audio (e.g. paging speaker) and visual (e.g. silent radio) output capability in any one paging zone or group of paging zones, the assignment of respective paging operations and importance of input stimuli to the system are selectable by the user. Moreover, control inputs to the paging system of the present invention may be derived from a variety of sources, including, but not limited to, a telephone attendant access, a telephone interface, a prescribed facility input device, such as a night bell, or one or more programmable input/output devices, such as user selectable switch devices, the settings of respective ones of which are associated with prescribed signalling actions associated with one or more output devices installed by the user to define the overall functionality and communication capabilities of the paging system.

Because the paging system controller of the present invention is capable of being accessed from a plurality of inputs and is intended to provide single or multiple output signalling capability, the respective access inputs to which it is intended to respond are given respective priorities of access permission, programmable by the user, so that, in the event of multiple simultaneous access inputs, a higher priority access input will always be given preference over a lower priority access input. For this purpose, the microcontroller maintains, in memory, a programmable access priority table, which may be changed (customized) by the user as desired, to assign respectively different access priority levels to respectively different classes or types of input access. The number of priority levels is not limited to any particular number, but may vary as user requirements change, the number and assignments being programmable, as noted above.

As a non-limiting example, in the description to follow, the controller will be described in association with five respectively different levels of access priority. The first or highest priority level is associated with access by an attendant. A first set of paging zone switch inputs is given the second highest priority level; telephone interface access is given a third highest priority level. A second set of paging zone switch inputs is given a fourth highest priority level, and a night bell is given a fifth highest priority level. In the absence of an access input from any of these priority levels, the controller may default to a prescribed signal source, such as music or news broadcast, for providing 'background' audio to the paging zones served by the system.

It should be observed, however, that the priority level assignments to be described are merely illustrative, and are not to be construed as a preferred order of access. For example, where the paging controller is installed in an industrial facility where hazardous materials are handled, it may be required that each paging zone be provided with a hazard emergency input (for example, in the form of an emergency throw switch), with activation of any hazard emergency switch causing the controller to immediately assert emergency warning signals (audio and visual) to all paging zones (throughout the facility). In such a case, the highest priority would be assigned to one or more zone input switches, rather than attendant access of the example to be described below.

ATTENDANT ACCESS (HIGHEST PRIORITY)

As described above, in the present description, the highest priority of access to the functionality of an attendant paging system served by the control system of the present invention is given to an attendant (operator position). As will be described, should the controller be occupied servicing a lower priority request at the time of an attendant access, the controller terminates that previous service request and grants immediate access to the attendant.

For this purpose, as shown in FIG. 4A, audio/paging signals (e.g. sourced from an operator's headset microphone (MIC)) from an accessing attendant's position are applied differentially to terminals 61 and 62 of a differential input port 60 of a multi-pin input jack J3, and coupled through balanced resistor—capacitor filter networks 64 and 65 to respective input terminals 67, 68 of a (unity gain) differential amplifier 70. The coupling of the attendant's input through a balanced differential input pair serves to effectively cancel out common mode noise components from the desired input signal. The output 71 of differential amplifier 70 is coupled via link 72 to a first audio signal input 81 of an audio signal path multiplexer (MUX) 80.

Input jack J3 also has an input port 66 which is coupled to an attendant access detection driver circuit 69. Attendant access detection driver circuit 69 has an output terminal or node 75, the logic state of which, denoted by (AA_DET), changes state (is asserted high) in response to an attendant connecting a low (GND) to port 66 of jack J3.

Figure 6A:
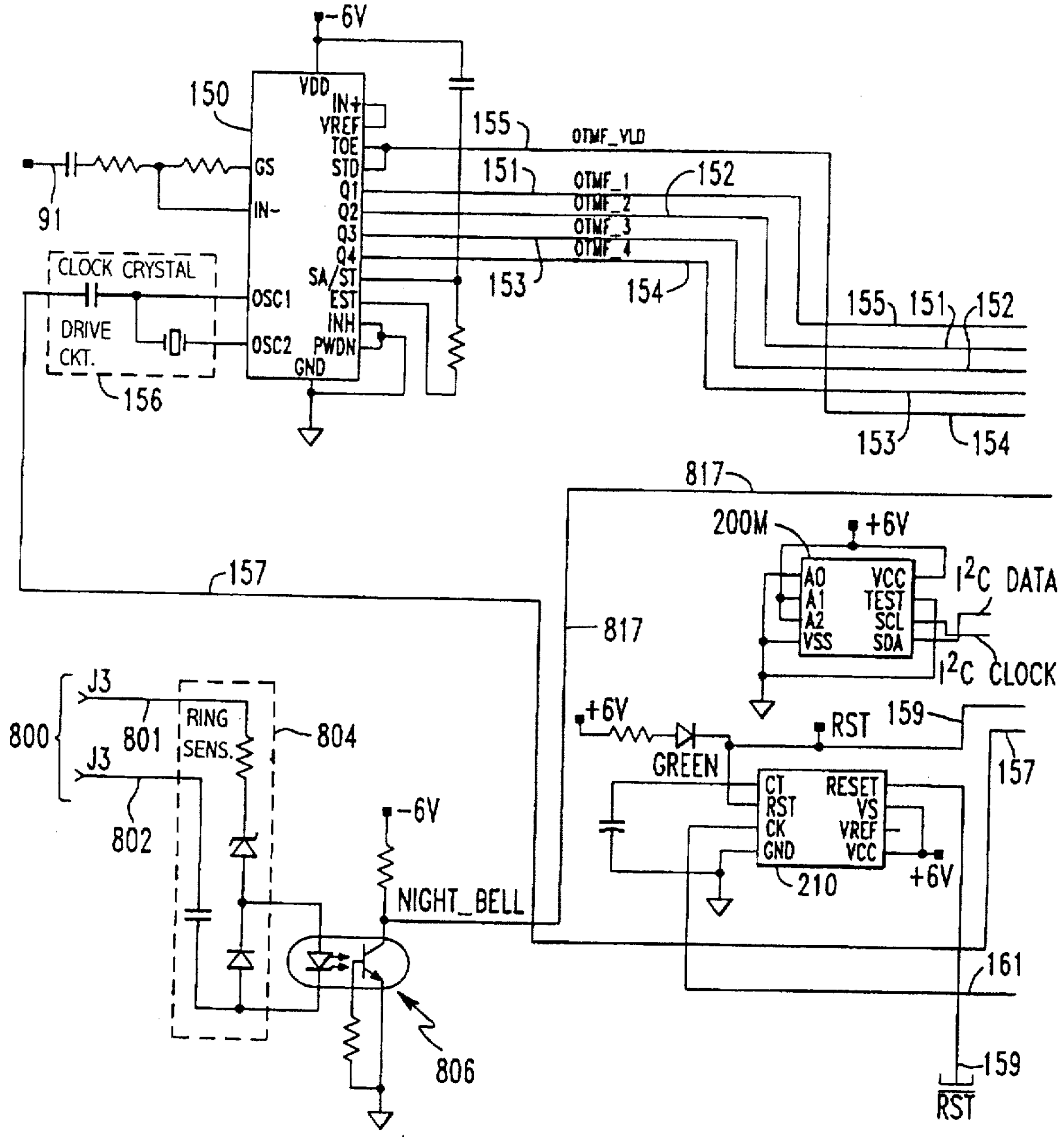
FIGS. 6A and 6B taken together schematically illustrate the circuit configurations of DTMF decoder, night bell detection, control processor, multi-port and digital data port connections employed in the paging system controller of FIG. 1.
Figure 6B:
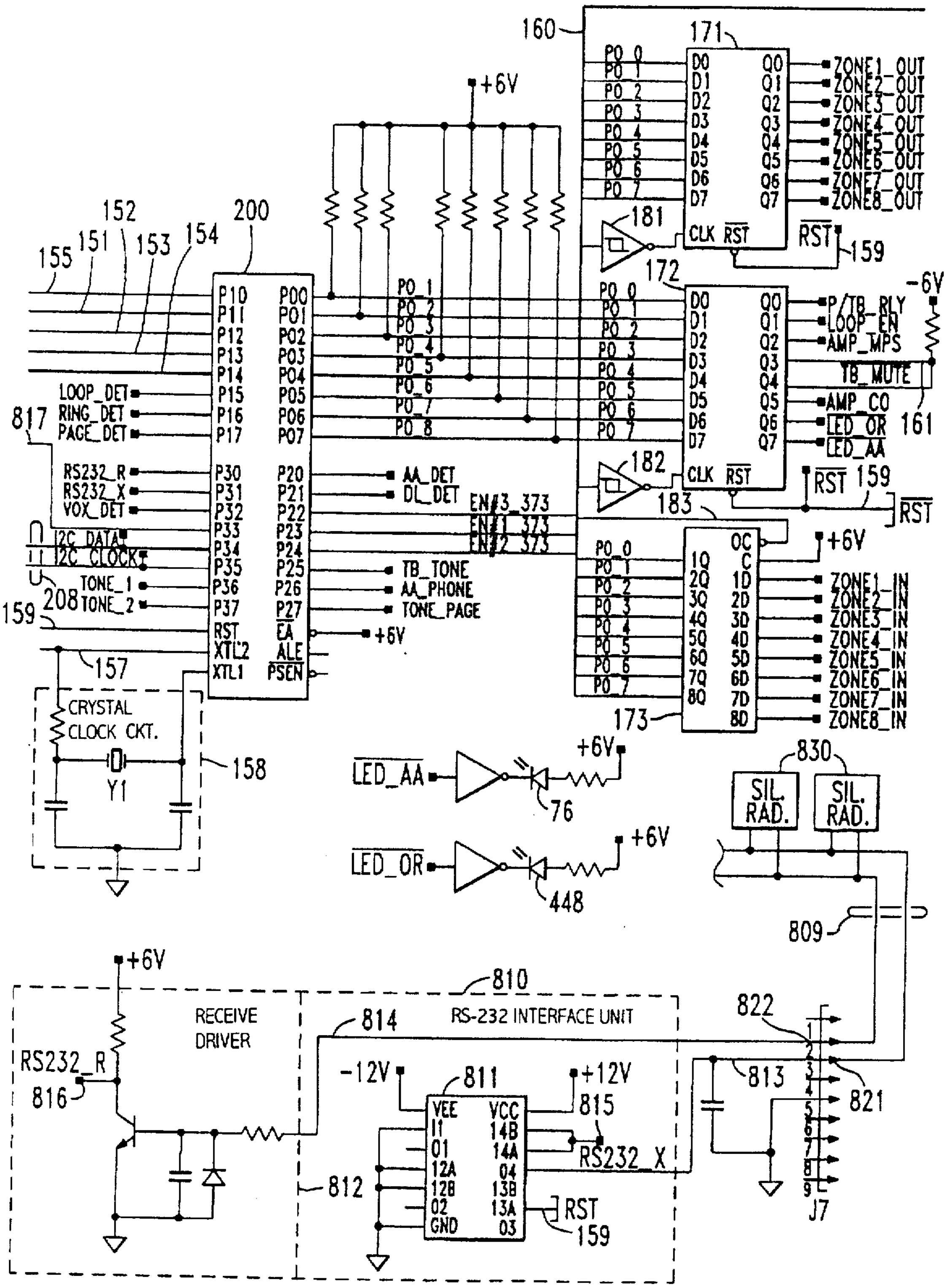

The AA_DET signal at terminal 75 is coupled to an AA_DET input port P20 of a system micro-controller (processor) 200 (FIG. 6B). As will be described, processor 200, which may comprise a Motorola 80C52 microprocessor, has a plurality of input/output ports and is operative to execute a user-programmed paging system signal processing routine resident in attendant operating system memory 200M, which is coupled to processor 200 via respective clock and data portions $I^2C$_CLOCK and $I^2C$_DATA, respectively of an $I^2C$ bus 200B. The function and microcontroller input/output port assignment of the logic state descriptor AA_DET and other logic state descriptors to be referenced below are listed in a port assignment table, shown in FIGS. 9–12.

In response to the change in state of the AA_DET input, processor 200 is operative to set the signal path states of respective components of the system to provide control and audio signal paths from the accessing attendant to one or more designated output devices. In particular, as listed in Table 1, for the purpose of completing the attendant's audio signal path in response to the AA_DET signal, processor 200 is operative to assert an active low on a AA_PHONE control input 87, which is one of three control inputs (86, 87 and 88) to audio signal path multiplexer (MUX) 80, shown in FIG. 4B. The assertion of a low input on AA_PHONE input 87 causes the multiplexer (mux 80) to couple its input 81 to output 89, so that attendant audio signals are passed to a link 91 PAGE-DTMF to which mux output 89 is connected. The output of mux 80 is also coupled via a link 77 to a VOX detector 78, which is operative to provide a control signal identified as VOX-DET on output terminal 79 in association with a station access input to a telephone interface unit, as will be described.

Audio signal multiplexer (MUX) 80 has a second input 82 coupled via link 83 to a hybrid filter circuit 84, the circuit parameters of which are selected to allow telephone interface-sourced audio and tone signals to be passed through the filter to the second input 82 of audio multiplexer 80, but blocking prescribed processor-sourced tone signals and also paging zone-sourced talk-back audio signals, from reaching input 82. As noted above, audio signal multiplexer 80 has a set of control inputs 86, 87 and 88 coupled to receive respective select control signals TONE/PAGE, AA_PHONE AND TB_PHONE, for controlling the coupling of inputs 81 and 82 to output port 89. The use of the TONE/PAGE, and TB_PHONE inputs will be described below.

Figure 5A:
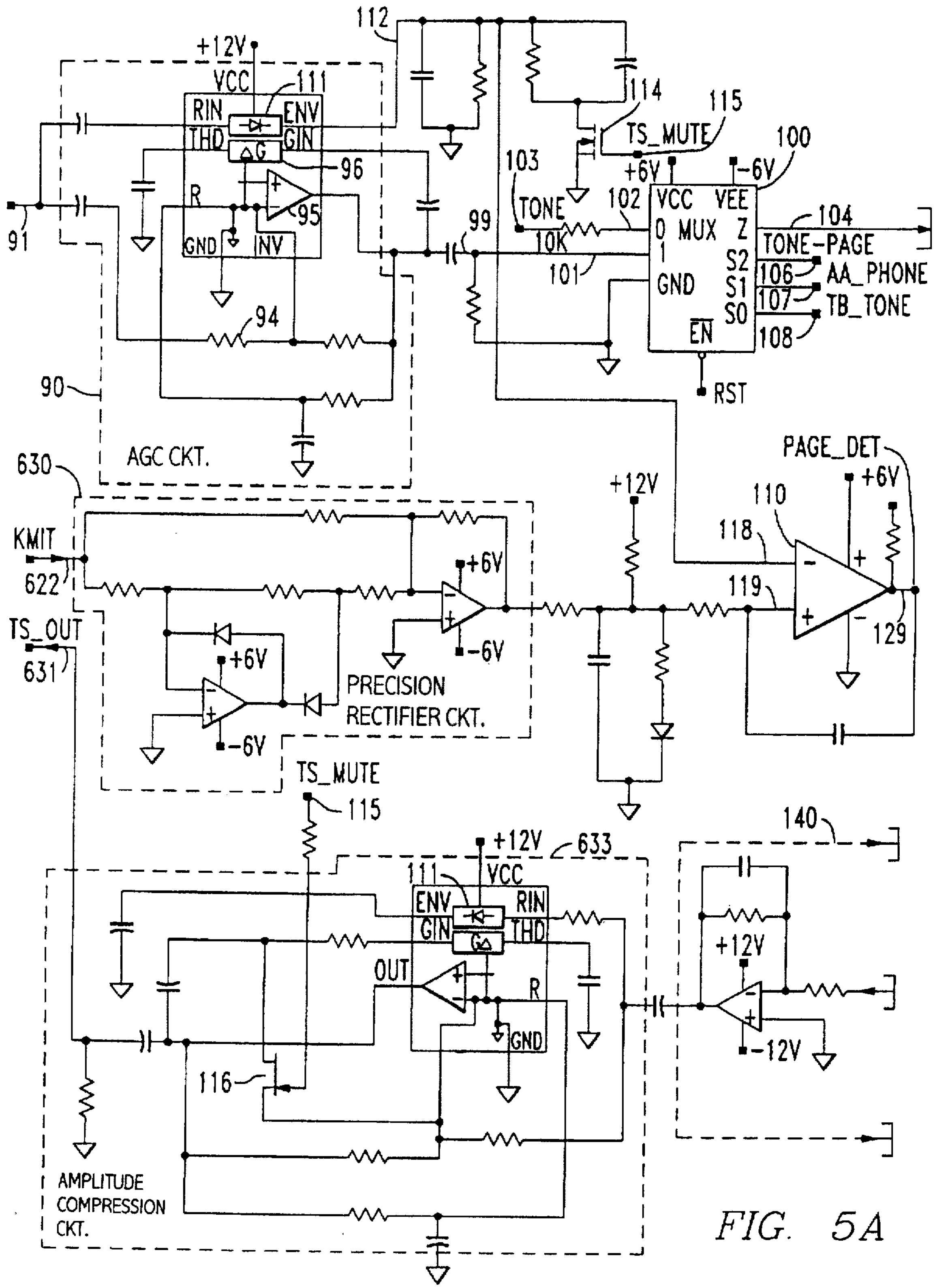
FIGS. 5A and 5B taken together schematically illustrate the circuit configurations of paging, tone and talkback path signal processing circuits of the bidirectional audio signal interface unit of FIG. 1.

As shown in FIG. 5A, PAGE-DTMF link 91 is coupled from the output 89 of audio signal path multiplexer 80 through an input resistor 94 of a controlled gain amplifier stage 95 of an automatic gain control (AGC) circuit 90. The gain of AGC amplifier stage 95 is defined by a gain control feedback stage 96 in accordance with the rectified voltage provided by precision rectifier 111. The gain-controlled audio signal output of AGC circuit 90 is coupled via link 99 to a first input 101 of a second audio signal path multiplexer 100, a second input 102 of which is coupled to a TONE terminal 103 derived from a tone signal summing circuit 105, shown in FIG. 4B, to be described.

Figure 5B:
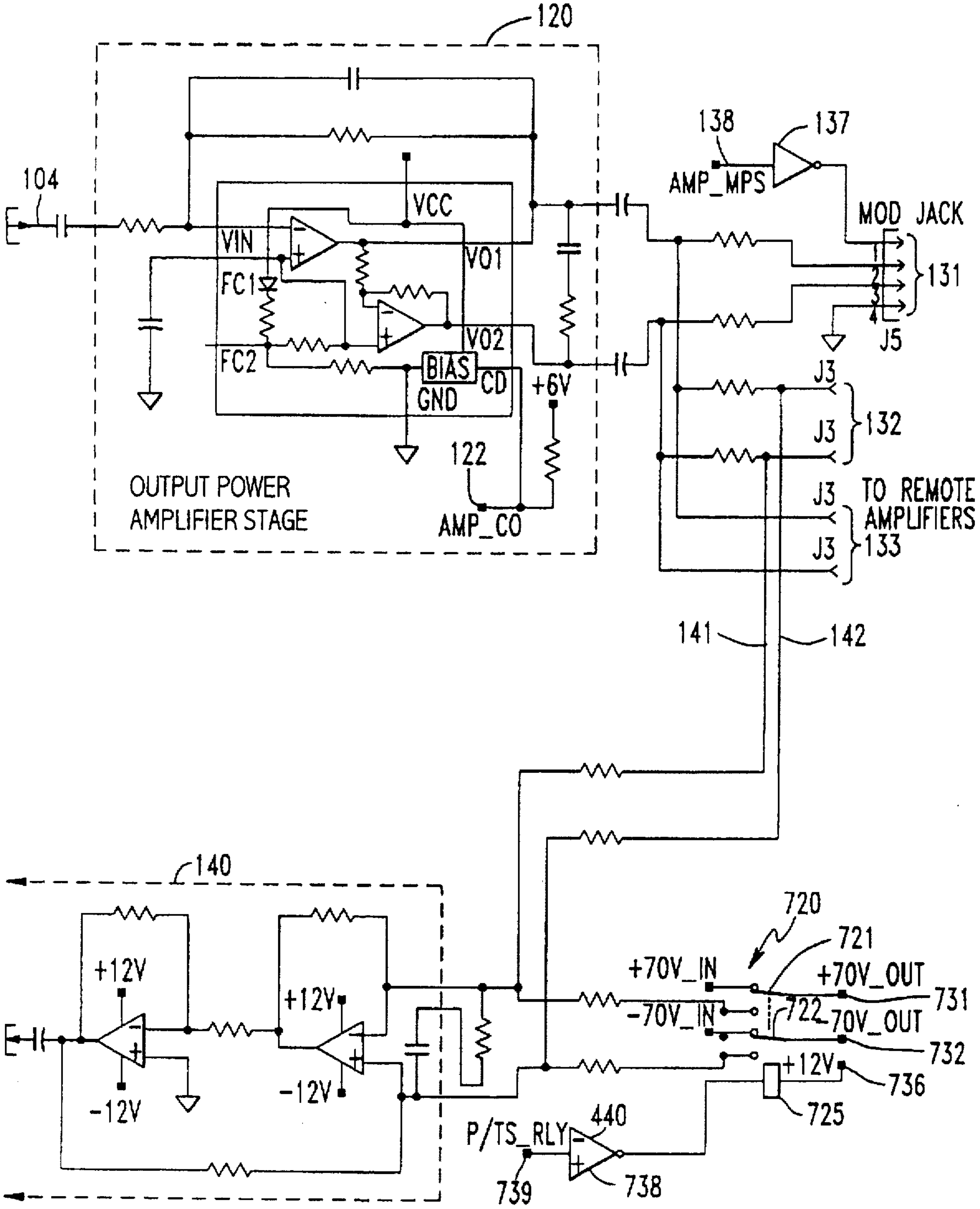

Audio signal multiplexer 100 has an output 104 coupled via line 106 to an output power amplifier stage 120, shown in FIG. 5B. Like audio signal mux 80, audio signal multiplexer 100 has a set of control inputs 106, 107 and 108 coupled to receive respective processor-sourced control signals TONE/PAGE, AA_PHONE AND TB_PHONE, for selectively controlling the coupling one of its two inputs 101 and 102 to output port 104, as will be described.

PAGE-DTMF link 91 is also coupled to the precision rectifier 111 of a page signal automatic gain control (AGC) circuit 90. Precision rectifier 111 provides a rectified (DC) voltage on output link 112 representative of the audio (voice) level on audio signal path link 91. Link 112 is coupled to a first input 118 of a (differential amplifier-configured) page/talkback threshold detection circuit 110.

Page/talkback detection circuit 110 is operative to compare the DC level on input 118 with a (paging zone noise-dependent) threshold value on input 119 and control the logic level at its page detection output PAGE_DET NOT terminal 129 in dependence upon whether or not the signal level of the audio signal path 91 (as rectified into a DC voltage by precision rectifier 111 on page audio input 118) exceeds the reference threshold provided at input 119. PAGE_DET NOT terminal 129 is coupled to input port P17 of processor 200.

The page/talkback threshold detection circuit 110 serves to cause a page audio signal on audio signal path 91 from the telephone interface (to be described) to override a talkback audio signal supplied from a telephone interface input, in dependence upon a threshold sensing level (at input 119) that is adjustable in accordance with the level of noise in the paging zone from which talkback audio is provided.

Link 112 is also coupled to one end of a MOSFET switch 114, having its gate coupled to a terminal 115, which coupled to receive a processor-sourced talk-back mute control signal TB_MUTE, and its source-drain path coupled in circuit between ground and line 112. Talk-back mute terminal 115 is also coupled to the gate of a MOSFET switch 116 of an amplitude compression circuit 633 to which a talkback amplifier stage 140 is coupled, as will be described. When the control processor 200 asserts the TB_MUTE control signal as a logic 0 at talk-back mute terminal, these respective MOSFET switches 114 and 116 are operated to mute talk-back audio on a return path from a paging speaker and to allow paging from a paging source to the speaker output circuitry.

Output power amplifier stage 120 is operative to drive a set of output ports 131, 132 and 133, to which amplifier circuitry of an associated paging amplifier system may be coupled. Amplifier stage 120 has a processor-control port 122 to which a control signal AMP_CD from the system's micro-controller is coupled for enabling (setting the bias voltage for) amplifier. The output of amplifier circuit 120 is not intended to serve as a direct input drive to one or more speakers, since, as pointed out previously, the control system of the present invention serves as a supervisory routing interface between one or more paging input signal sources and one or more associated output devices, such as audio speakers or visual display units. Instead, amplifier stage 120 provides preliminary amplification of audio/tone signals provided over the audio signal path and intended for application to one or more output audio signalling devices driven by the attendant paging amplifier driver units. Once amplified by the paging amplifier driver subsystem, the audio signals are routed to respective paging zone speakers. In the course of routing the audio/tone signals to zone speaker stages, +/−70 VAC ports of zone switches (shown in FIG. 7, to be described) are enabled to supply the power inputs necessary for operation of the speaker stages.

Of the audio signal path output ports driven by audio path output amplifier stage 120, output port pair 131 serves as a 0 dbm port of an audio signal output lack J5 for connection to the speaker amplifier subsystem. Coupled with audio signal output jack J5 is a driver 137, an input 138 to which AMP_MPS is asserted high when a paging zone has been selected. The AMP_MPS signal is employed to enable the audio output speaker amplifier subsystem. Output port pair 132 provides a 0 dbm port of an audio signal output jack J3. A 0 dBu output is provided by output port pair 133 to a remote amplifier unit. The speaker of a remote unit to which port 132 is coupled may also serve as a bidirectional audio transducer, sourcing talk-back audio signals from a paging zone speaker. Links 141 and 142 couple talk-back audio from the remote speaker to the signal flow path of a talk-back amplifier stage 140, as will be described.

Referring now to FIG. 6A, the PAGE_DTMF audio signal path 91 at the output of audio signal multiplexer 80 is also coupled to a dual tone multifrequency signal (DTMF) decoder 150. DTMF decoder 150 has a (valid DTMF signal) output port DTMF_VLD which is coupled via link 155 to input port P14 of processor 200. The logic state of output port DTMF_VLD is asserted active high in response to decoder 150 detecting a valid DTMF signal. The (digital hex) contents of a valid dual tone signal are coupled via output links 151, 152, 153 and 154 to respective input ports P11, P12, P13 and P14 of processor 200. DTMF decoder 150 has an associated clock crystal drive circuit 156, which is also coupled via link 157 to a clock drive input XTL2 of processor 200. Processor 200 has an additional clock drive input XTL1 coupled to a further crystal clock circuit 158. (Crystal clock inputs XTL1 and XTL2 provide the clock reference sources required by microcontroller 200.) System reset is provided by way of a reset port RST to which link 159 is coupled. RST link 159 is coupled to an associated watchdog timer 210, an enable (CK) input for which is coupled via link 161 from the Q4 output port of latching driver 173.

The processor-sourced control signals TONE/PAGE, AA_PHONE AND TB_PHONE, referenced previously, which are steering inputs for the audio/tone signal paths through the audio signal multiplexers, are provided on processor output ports P25, P26 and P27.

Processor 200 also has a set of bidirectional data ports P00–P07, which are coupled via a system digital data bus 160 to respective data inputs D0–D7 of each of a pair of multi-port latching output driver units 171 and 172, and to respective data outputs Q0–Q7 of a multi-port input buffer driver unit 173. Output latching driver 171 has a plurality (e.g. eight) of output ports Q1–Q7 coupled to output ports ZONE1OUT–ZONE8OUT, to which respective relay driver inputs associated with a plurality of presettable zone switch units 300 (shown in FIG. 7, to be described) are coupled. Multi-port latching driver 172 has a plurality of output ports Q1–Q7 coupled to provide respective control signals which are routed to various circuit components within the system, as will be described. Input buffer driver unit 173 has a set of zone input ports ZONE1_IN–ZONE7_IN, to which output terminals of the presettable zone switch units 300 are coupled, as will be described. Output latching driver units 171 and 172 are controllably enabled via respective control lines 181 and 182 from output ports P22 and P23 of processor 200. Input buffer unit 173 is controllably enabled via control line 183 from output port P24 of processor 200.

Figure 7:
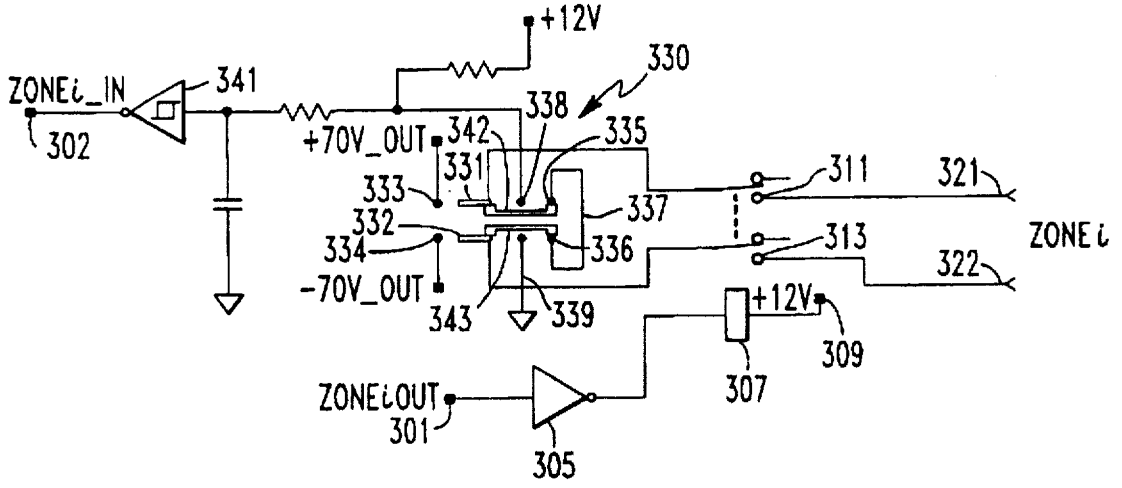
FIG. 7 schematically illustrates the circuit configuration of a programmable zone switch unit.

As noted above, output latching driver 171 has a plurality of output ports Q1–Q7 coupled to output ports ZONE1OUT–ZONE7OUT, to which control inputs of respective relay driver inputs associated with a plurality of presettable zone switch units 300, shown in FIG. 7, are coupled. More particularly, each switch unit 300 comprises an input control port 301, to which a respective ZONEiOUT port of multiport latching driver 171 is coupled, and an output port 302, to which a respective ZONEI_IN port of multiport input buffer unit 173 is coupled. Input control port 301 is coupled to a relay driver 305, the output of which is coupled in circuit with relay winding 307 and voltage terminal 309. When the logic state of input control port 301 (ZONEiOUT) is asserted high by processor 200, the output of relay driver 305 goes low, thereby energizing relay winding 307 and switching a pair of normally open relay contacts 311, 313 to their closed position, to which a pair of switching unit zone connection terminals 321 and 322 are connected.

The common connections of contacts 311 and 312 are coupled to respective ones of first switch terminals 331 and 332 of a user-presettable switch 330. Presettable switch 330 further includes second switch terminals 333 and 334 respectively coupled to receive voltages for driving the speaker amplifiers (e.g. +70 VAC and −70 VAC). A further pair of switch terminals 335 and 336 is shorted together via a bridge link 337. An additional pair of terminals 338, 339 are coupled to an input driver 341 and ground potential, as shown. A pair of ganged sliding contacts 342 and 343 is arranged to be slidably positioned among the respective switch contact pairs, so as to enable the switch unit to provide an input state and first and second output states.

More particularly, in the position shown, in response to the assertion of a ZONEiOUT active state to input control terminal 301, thereby energizing relay winding 307, the switch unit is operative to provide a circuit path loop connection through bridge connection 337, contact pair 335, 336, sliding contacts 342, 343, terminals 331, 332, closed switch contacts 311 and 313 and terminals 321, 322. Namely, in this position of sliding contacts 342, 343, the switch unit may be used to provide a closed circuit path connection to an output device whose terminals are coupled to zone terminals 321, 322. This enables the switch unit to be effectively employed as an on/off switch for an audio or video device, such as the activating of a prerecorded announcement playback device through one or more paging speakers, or the activation of visual display playback unit to drive a message display device, such as a silent radio.

When the sliding contacts 342, 343 are moved two positions to the left, so that sliding contact 342 connects terminals 331 and 333, and sliding 343 connects terminals 332 and 334, then, in response to the assertion of a ZONEiOUT active state to input control terminal 301, thereby energizing relay winding 307, the switch unit is operative to provide +/−70 VAC circuit path connections from contact pair 333, 334, sliding contacts 342, 343, terminals 331, 332, closed switch contacts 311 and 313 and terminals 321, 322, for driving associated speaker amplifiers to which zone terminals 321 and 322 are connected.

When the sliding contacts 342, 343 are moved one position to the left from the position shown in the FIG. 7, so that sliding contact 342 connects terminals 331 and 338, and sliding 343 connects terminals 332 and 339, then the switch is operative as an input device in accordance with the connection state of terminals 321 and 322. When used as an input device, the ZONEiOUT terminal 301 is held active, thereby maintaining relay winding 307 in an energized state, so that switch terminals 331 and 332 are connected to zone terminals 321 and 322, respectively. When an external contact closure (e.g. the operation of a push-button switch connected across terminals 321 and 322) is operative to bridge zone terminals 321 and 322, a circuit path is established between switch terminals 338 and 339, thereby asserting a low (ground) at the input to driver 341, causing its output at terminal 302 to change state (be asserted active high). This active high assertion on ZONEi_IN terminal 301 is read by processor 200 in the course of its periodic polling of the zone inputs of zone input buffer 173. The action taken by processor 200, in response to this active high assertion on ZONEi_IN terminal 301 will depend upon the priority level and response operation associated with the ZONEi_IN logic level.

Looking now at the operation of the paging control system in response to an attendant access (assertion of a ground to input port 66), as pointed out above, in order to initiate a page the attendant must assert a low at attendant page input port 66. Prior to an attendant asserting a page, the system may be handling a page access request of a lower level of priority, or it may be idle, in which event, the paging speakers may coupled to background audio source signals, such as music or news broadcast signals. If a lower level priority page access (e.g. from a telephone interface) is currently being handled, the processor initially asserts a warning (override) tone to the page request currently being serviced, to advise the calling party that the currently active page request is being terminated in favor of a higher priority page request. The manner in which the override tone is generated and supplied to the telephone interface will be described below in association with the description of that circuitry.

When the attendant asserts a low at attendant access input terminal 66, the AA_DET signal at terminal 75 changes state (will be asserted active high), which is read by control processor 200 at attendant access input port P20, causing processor 200 to set the signal path states of respective components of the system, so as to provide control and audio signal paths from the accessing attendant to one or more designated output devices. Also, whenever an AA_DET signal is asserted, an associated light emitting diode, shown at 76, is energized by processor 200 asserting an enabling level to the Q7 output of latching driver 172.

In particular, processor 200 asserts a logical '0' at the AA_PHONE input 87 of audio multiplexer 80 and at the AA_PHONE input 10 of audio multiplexer 100. A logical '1' is asserted at the other control inputs. As a result, the attendant's audio signal path (PAGE_DTMF) is placed in circuit with output amplifier stage 120, so that an audio signal path is provided from the attendant to the output jack J5 to which attendant subsystem speaker amplifier circuitry is coupled. In addition, PAGE_DTMF link 91 is coupled in circuit with DTMF decoder 150, so that DTMF decoder 150 may receive and decode any DTMF-based paging zone designation signals sourced from the attendant's position, and thereby permit the attendant to 'dial in' or enter paging zone data in accordance with the operational routine resident in processor 200.

Namely, once connected in the manner described above, the accessing attendant has the ability to instruct processor 200 to assert output signals via a specified one or more of output zone ports ZONE1OUT–ZONE7OUT, to which switch units 300 are coupled, and thereby control to what output devices specified actions are to occur. For example, for those switch units 300 whose switch positions have been set to their +/−70 V positions, the attendant may supply a real time audio page through an associated (70 V) loudspeaker. The page may also be coupled to one or more specified amplified speakers or a specified group of speakers. The accessing attendant may also instruct the processor to assert an output on one or more of the switch units 300 (whose sliding switch contacts have been preset for this option), so that the attendant may controllably activate a zone utility device, such as an alerting strobe light or prerecorded visual and/or message the operation of which is responsive to the closure of the zone switch contacts.

In addition, as will be described in detail below, through DTMF signalling or through a serial data communications interface (e.g. RS-232 port) the attendant may instruct processor 200 to transmit a preprogrammed (audio/visual) page signalling protocol to one or more virtual digital port addresses distributed on an associated data communications bus. Any device addressed either individually or globally by this protocol will respond by generating a prescribed audio/visual message. For example, a paging facility served by the present invention, such as an airport terminal, may have a plurality of display terminals (e.g. silent radio message boards) distributed at a number of locations. Through the serial data communications bus, paging attendant may initiate the display of a prerecorded message at each message board.

To terminate the page, the attendant removes the ground connection that had been previously asserted at input port 66, thereby causing the AA_DET logic level at terminal 75 to be de-asserted low. This change in stage of logic level at the AA_DET terminal 75 advises processor 200 that the page has been terminated and the attendant's control is released.

INPUT TYPE ONE (SECOND HIGHEST PRIORITY)

As described earlier, in the present example of priority level assignment, the second highest priority of access to the paging system served by the controller of the present invention is given to an input type one access. This type of access is associated with one or more zone inputs ZONEi_IN, which are coupled to respective output terminals of one or more zone switches 300, the operation of which will cause the controller to initiate paging operations which the user has predetermined to be second in importance to only attendant access. Since the paging functionality is user-defined and user-prioritized, it is effectively a customized feature that the user programs, both in terms of input/output device and the effect of its operation (e.g. the activation of a push-button switch as a zone input signal, for the purpose of initiating the playback of a prerecorded audio/video message in one or more paging zones). The priority assigned to any ZONEiIN signal is stored in the paging routine's priority table, so that, when processor 200 polls multi-port input driver 173 and detects an asserted ZONEiIN input, it examines the priority table to determine the priority level of the asserted input. For a ZONEiIN of input type one, the access is serviced ahead of all page access requests except attendant access described above.

The action taken by processor 200 in response to detecting an asserted ZONEiIN logic level of input type one is in accordance with a preprogrammed response routine stored in memory and will involve the assertion of one or more ZONEi_OUT signals to one or more respective data inputs D0–D7 of multi-port latching output driver unit 171. As previously described, output latching driver 171 has a plurality (e.g. eight in the present example) of output ports Q1–Q7 coupled to output ports ZONE1OUT–ZONE7OUT, to which respective relay driver inputs associated with a plurality of presettable zone switch units 300 are coupled.

As explained above in connection with the description of FIG. 7, for the illustrated switch position of a zone switch 300 as an output signal path-defining device, in response to the assertion of a ZONEiOUT active state to input control terminal 301, relay winding 307 is energized, so that the zone switch provides a circuit path connection to an output device whose terminals are coupled to zone terminals 321, 322. This enables the zone switch 300 to be employed, for example, as an on/off switch for an audio or video device, such as the activating of a prerecorded announcement playback device through one or more paging speakers, or the activation of visual display playback unit to drive a message display device, such as a silent radio.

Thus, similar to an attendant access, through programming of the paging routine resident in processor memory, a zone switch input may be employed to instruct processor 200 to output prescribed alerting tone signals, which are coupled to a specified one or more of output zone ports, as directed by zone outputs ZONE1OUT–ZONE7OUT, so that the input type one-initiated alerting tone may be coupled to one or more specified amplified speakers or a specified group of speakers. The zone inputs may also be used to instruct the processor to assert an output on one or more of the switch units 300 (whose sliding switch contacts have been preset for this option), to controllably activate a zone utility device, such as a warning strobe light or prerecorded visual and/or message the operation of which is responsive to the closure of the zone switch contacts. Also, through programming, the processor may transmit a preprogrammed (audio/visual) page signalling protocol to one or more virtual digital port addresses distributed on an associated data communications bus. As explained above, in connection with the description of an attendant access, any audio/visual output device addressed either individually or globally by this protocol will respond by generating a prescribed audio/visual message.

Upon completing the servicing of an input type one access request, processor 200 continues to poll the respective inputs of multi-port input driver 173. As long as there is no overriding attendant access request, then whenever an input type one request is asserted active, it will be serviced in the manner described above. Should the controller be occupied servicing a lower priority request at the time of an input type one access, the controller terminates that previous service request and grants immediate access to the input type one access.

TELEPHONE INTERFACE (THIRD HIGHEST PRIORITY)

In the present example, the third highest priority of access to the functionality of an attendant paging system served by the control system of the present invention is given to a calling party telephone access. If the controller is servicing either the attendant or a type one priority request, access will be granted to a telephone interface access request, and a busy tone will be returned to the telephone interface. If the attendant access is not active, and if input type one is not active, a select tone will be returned to the telephone interface.

As will be described, a telephone interface access may be any one of four modes or types: 1) loop start; 2) ground start; 3) station; and 4) dry loop.

Telephone interface access is byway of a modular jack J4, having respective tip and ring terminals 401 and 402, which are coupled to the tip and ring lines of a telephone line, a ground terminal 403, which is coupled to system ground, and a dry loop terminal 404, which is coupled to a dry loop detection circuit 405, the output of which DL_DET, at terminal 406, goes active high, in response to a logical low being asserted at terminal 404 by a telephone device (e.g. PBX). The DL_DET signal is coupled to input port P21 of processor 200.

The tip terminal 401 is coupled via link 411 to a first switchable contact arm 421 of a loop supervision relay 420. The ring terminal 402 is coupled via link 412 through a fuse 409 to a second switchable contact arm 422 of relay 420. Contact arms 421 and 422 are switched from their normally closed positions at terminals 431 and 432 by the energization of a relay winding 430, which is coupled in circuit between an energizing voltage source terminal 408 and the output of a relay driver 440, the input to which is coupled to a loop enable LOOP_EN terminal 441, the logic state of which is defined by the Q1 output port of latching driver 172. As will be described, processor 200 causes a logical low to be asserted at LOOP_EN terminal 441 in response to the logical level at a loop detection LOOP_DET terminal 443, which is coupled to processor input port P15 being asserted active low. (Whenever a LOOP_DET signal or a DL_DET signal is asserted an associated light emitting diode, shown at 448, is energized by processor 200 asserting an enabling level to the Q6 output of latching driver 172.)

Terminals 431 and 432 of loop supervision relay 420 are looped through a ring sensing portion 434 of a ring detect opto-isolator 436, the output of which (RING_DET NOT) is supplied at terminal 438, which is coupled to input port P16 of processor 200. Opto-isolator 436 is operative to provide an active 17–63 Hz ringing signal supplied by an accessing telephone circuit.

A second terminal 451 of loop supervision relay 420 is coupled via link 461 to a terminal 473 of a presetable mode switch 470, and to a first end 481 of a first primary winding 483 of coupling transformer 480. A second end 482 of winding 483 is capacitor-coupled to a first end 491 of a second primary winding 493 of transformer 480 and through a resistor 501 to a terminal 513 of presetable switch 470, to a terminal 524 of a mode switch 520, which is ganged with mode switch 470, and to one end 531 of a bridge rectifier 530. A second end 492 of a second primary winding 493 is coupled through link 455 to a terminal 563 of mode switch 520 and to terminal 452 of loop supervision relay 420.

Mode switch 420 has terminals 471 and 475 connected together and to line 411; it also has terminals 511 and 512 connected in common to ground. Mode switch 520 has terminals 561, 562 and 566 connected in common to line 412; it also has terminals 521 and 522 connected in common to −24 VDC. Terminal 523 is coupled through resistor 503 to a second end 532 of bridge rectifier 530. Third and fourth ends 533 and 534 of bridge rectifier 530 are coupled to input ports 571 and 572 of a loop detect opto-isolator 570.

Coupling transformer 480 has series-connected secondary windings 601 and 602, a first end 611 of which is coupled via link 621 to hybrid filter circuit 84, and a second end 602 of which is grounded. Link 621 is coupled through voltage divider 603 to line 622. Line 622 is coupled to an output 193 of audio multiplexer 190, and through a precision rectifier circuit 630 to a second input 119 of page/talkback page/talkback detector 110. The parameters of precision rectifier circuit 630 are chosen to match those of the precision rectifier 111 of AGC circuit 90, in order to enable page/talkback detector 110 to accurately distinguish between page and talkback audio signals.

Like audio signal multiplexers 80 and 100, audio signal multiplexer 190 has a set of control inputs 196, 197 and 198 coupled to receive respective select control signals TONE/PAGE, AA_PHONE AND TB_PHONE, for controlling the coupling of inputs 191 and 192 to output port 193. Input port 191 is coupled over talkback out (TB_OUT) link 631 to the output of an amplitude compression circuit 633 to which talkback amplifier stage 140 is coupled. As described earlier, the speaker of a remote unit to which port 132 is coupled may also serve as a bidirectional audio transducer, sourcing talk-back audio signals from a paging zone speaker.

Links 141 and 142 couple talk-back audio from port 132 to the signal flow path of talk-back amplifier stage 140, so that talkback audio signals from port 132 may be conditioned by stages 140 and 653 and applied through audio signal multiplexer 190 to the telephone interface. The second input port 192 of audio multiplexer 190 is coupled to the tone terminal TONE output 103 of tone signal summing circuit 105, the input to which is coupled to sum respective tone signal inputs (TONE_1, TONE_2) controllably supplied from output ports P36, P37 of processor 200 to tone terminals 701 and 702.

Also coupled in circuit with talk-back amplifier stage 140 are switchable contact arms 721, 722 of a page/talkback relay 720. In their illustrated normally closed positions, switchable contact arms 721, 722 provide respective closed circuit paths for +/−70 VAC to attendant speaker amplification circuitry for powering speaker units. In their switched positions, switchable contact arms 721, 722 provide respective circuit paths from speaker port terminals 731, 732 to talk-back signal amplifier stage 140, so that talk-back audio signals from those zone speakers employed as bidirectional transducers may be amplified and conditioned for application to the telephone interface circuitry.

For this purpose, page/talkback relay 720 has a relay winding 725 which is coupled in circuit between a (+12 VDC) voltage terminal 736 and the output of a relay driver 738. The input to relay driver 738 is coupled to terminal 739, to which a page/talk-back relay control input (P/TB-RLY) logic level is controllably asserted by processor 200 from the Q1 output of latching driver 171. When processor 200 asserts an active high on page/talk-back relay control input (P/TB-RLY) terminal 739, the output of driver 438 goes low, energizing relay 720 and providing a talk-back path from the paging zone to which speaker port terminals 731 and 732 are connected.

The operation of the telephone interface will now be described for each of the above-identified four telephone interface access modes: 1) LOOP START; 2) GROUND START; 3) STATION; and 4) DRY LOOP. For each of these respective telephone interface access modes mode switches 470 and 520 are positioned at a respectively different switch position.

For LOOP START mode, the mode switches 470 and 520 are set at positions shown in FIG. 4A. In this first position, the respective sliding contacts of mode switch 470 connect terminal 471 to terminal 473 and connect terminal 511 to terminal 513. Also, the respective sliding contacts of mode switch 520 connect terminal 561 to terminal 563 and connect terminal 521 to terminal 523.

For GROUND START mode, the switches are moved down one position from the positions shown in the drawings. In this second position, the respective sliding contacts of mode switch 470 connect open terminal 472 to terminal 473 and connect terminal 512 to terminal 513. Also, the respective sliding contacts of mode switch 520 connect terminal 562 to terminal 563 and connect terminal 522 to terminal 523.

For STATION mode, the switches are moved down two positions from the positions shown in the drawings. In this third position, the respective sliding contacts of mode switch 470 connect terminal 473 to open terminal 474 and connect terminal 513 to open terminal 514. Also, the respective sliding contacts of mode switch 520 connect terminal 563 to open terminal 565 and connect terminal 523 to terminal 525.

For DRY LOOP mode, the switches are moved down three positions from the positions shown in the drawings. In this fourth position, the respective sliding contacts of mode switch 470 connect terminal 473 to open terminal 475 and connect terminal 513 to open terminal 515. Also, the respective sliding contacts of mode switch 520 connect terminal 563 to terminal 566 and connect terminal 523 to open terminal 526.

LOOP START MODE

In LOOP START mode, (−24 VDC) talk battery will be provided from the controller to the host telephone system through modular jack J4. As described above, in this mode, the mode switches 470 and 520 are in the positions shown, so that the respective sliding contacts of mode switch 470 connect terminal 471 to terminal 473 and connect terminal 511 to terminal 513. Also, the respective sliding contacts of mode switch 520 connect terminal 561 to terminal 563 and connect terminal 521 to terminal 523. As a consequence, when the host telephone system, which is coupled to jack J4, goes off-hook, a closed loop circuit path is provided from the −24 VDC talk battery at terminal 521 through resistor 503, bridge rectifier 530, opto-isolator 570, transformer winding 493, line 455, sliding contact-connected switch terminals 561–563, line 412 to ring, through the host, return on tip through line 411, sliding contact-connected switch terminals 471–473, line 461 through primary winding 483, resistor 501, sliding contact-connected switch terminals 513-511 to ground.

With current flowing through opto-isolator 570, LOOP_DET terminal 443 is asserted low, which is detected by processor 200. In response to the loop detect signal, processor 200 supplies dial tone via its output terminal ports TONE-1, TONE-2 to input 192 of audio signal multiplexer 190. The TB_TONE control input 197 of mux 190 is asserted high, so as to couple dial tone at input port 192 to output port 193, for application over lines 622-621 through telephone interface coupling transformer 480 to the tip and ring lines of the accessing telephone circuit, via jack J4.

The accessing telephone circuit may then supply DTMF tones for designating a specific zone (or group of zone), which DTMF tones are coupled over tip and ring, through transformer 480 and applied through hybrid filter circuit 84 to the second input port 82 of audio signal multiplexer 80. Processor 200 will assert the TB_TONE control input of each of the audio signal multiplexers high, incoming DTMF signals are coupled through the PAGE/DTMF circuit path to DTMF decoder 150, where they are decoded and processed as described previously for an attendant access.

In response to paging zone DTMF identification code tones, processor 200 generates a confirmation or warning tone, which is coupled via its tone outputs TONE_1, TONE_2 through summing amplifier 105 to tone terminal 103, which is coupled to the second input 102 of audio signal multiplexer 100. Audio signal multiplexer 100 has its signal path controlled to pass the confirmation tone to the modular jack to the paging zone(s) of interest as a paging alert or paging precursor tone.

The page activity is the same as that of an attendant access, described above, except that audio input signals from the telephone interface are coupled through transformer 480 and duplex hybrid circuit 84 to the second input 82 of audio multiplexer 80, as opposed to being applied from an attendant access path to the first input 81 of audio multiplexer 80. The page signals are coupled from the output port 89 of mux 80 to PAGE/DTMF link 91 and to a voice activity threshold detector 78, the output of which is coupled to a VOX_DET output terminal 79, which is coupled to input port P32 of processor 200.

In response to a page signal, the logic level at terminal 129 goes active low, causing processor 200 to disable the talk-back path by asserting a low at TB_MUTE terminal 115, so that a page signal is passed to the designated zone(s). After a prescribed time out for an active high at PAGE_DET terminal 129, processor 200 causes the signal flow path to revert to the talk-back mode by asserting a high at TB_MUTE terminal 115, so as to allow audio signal to be provided through any remote source (e.g. zone speakers). Any talk-back signals are coupled through the talk-back path out to the telephone interface circuit, as described previously, and also through the XMIT link 622 to the PAGE_DET threshold circuit 110, so as to establish a reference voltage for controlling the operation of circuit 110. Since paging signals have preference over talkback signals, page/talkback detector 110 will be triggered by page signals causing a PAGE_DET signal to be asserted at terminal 129, whereby processor 200 mutes the talkback path via TB_MUTE terminal 115, thereby effectively performing a page signal override.

When the telephone interface-sourced page is terminated, the calling host circuit goes back on-hook, which terminates loop current through opto-isolator 570, causing the logical state of terminal 443 to go high, advising the processor 200 of the end of the call. Processor 200 responds by placing the audio signal multiplexers in a coupling mode for the talk-back path, so as to provide a low impedance path to hybrid duplex circuit 84 in the idle condition.

GROUND START MODE

In GROUND START access mode, the controller ground is coupled to the ground jack port 403 for a host telephone system ground. The mode switches 470 and 520 are moved down one position to a second position, with the respective sliding contacts of mode switch 470 connecting open terminal 472 to terminal 473 and thereby effectively opening the tip lead, while allowing the ring lead to provide battery (−24 VDC) through essentially the same path described above for loop start, namely from −24 VDC at terminal 522 through resistor 503, bridge rectifier 530, opto-isolator 570, transformer winding 493, line 455, sliding contact-connected switch terminals 562–563, line 412 and the ring lead to the host.

When the PBX asserts a trunk ground start, it couples the ring lead to its ground, which closes a DC path, causing loop current to flow through the opto-isolator 570 and asserting a signal on LOOP_DET NOT, to which processor 200 responds by applying a LOOP_EN signal at terminal 441, firing relay 420 and changing the contact positions of switch contacts 421 and 422, so as to remove the previous grounded ring path and close the audio path through tip and ring. The circuit now operates in the same manner as a LOOP START mode described above.

STATION MODE

For STATION mode, the mode switches 470 and 520 are moved down two positions from their LOOP START positions, so that the sliding contacts of mode switch 470 connect terminal 473 to open terminal 474 and connect terminal 513 to open terminal 514, and the sliding contacts of mode switch 520 connect terminal 563 to open terminal 565 and connect terminal 523 to terminal 525. In this switch configuration, the tip and ring leads are now connected directly to only ring detect opto-isolator 436. In response to ringing activity, a signal is produced on RING_DET NOT output terminal 438, in response to which processor 200 asserts LOOP_EN high, thereby energizing relay 420 and switching contacts 421 and 422 to terminals 451 and 452, respectively.

A DC circuit path is now closed through the telephone interface tip lead, terminal 451, lead 461, winding 483, terminal 525, resistor 503, bridge rectifier 530, opto-isolator 570, winding 493, line 455, terminal 452, contact 422 and the telephone interface ring lead. The paging operation of the circuit now operates in the same manner as LOOP START and GROUND START modes, described above.

Since the calling party has control of the call, VOX threshold detector 78 is employed to detect inactivity from the calling party. Processor 200 monitors VOS-DET terminal 79 and employs a time-out routine to de-assert the loop enable input to relay driver 440 in the event of no audio activity from the calling trunk for a prescribed time-out interval. When relay driver 440 is disabled, the telephone interface circuit returns to its idle condition.

DRY LOOP MODE

For fourth mode of operation, DRY LOOP (no battery) mode, a four wire interface (e.g. from a PBX) is employed, with no battery path provided from the controller to the telephone interface. In this mode, mode switches 470 and 520 are moved down three positions from their LOOP START positions, so that the respective sliding contacts of mode switch 470 connect terminal 473 to open terminal 475 and connect terminal 513 to open terminal 515, and the respective sliding contacts of mode switch 520 connect terminal 563 to terminal 566 and connect terminal 523 to open terminal 526. As a result, an AC circuit path is now completed through the telephone interface tip lead, line 411, terminal 475, sliding contact to terminal 473, lead 461, winding 483, winding 493, line 455, terminal 563, sliding contact to 566, line 412 and the telephone interface ring lead.

As noted earlier, to initiate a DRY LOOP access, the PBX causes a low to be applied to a DRY LOOP input terminal 404, which causes the DL_DET output of DRY LOOP detection circuit 405 at terminal 406 to go active high. In response to this signal at terminal 406, processor 200 establishes the audio paths through the audio and tone circuits in the manner described above and the paging operation of the circuit operates in the same manner as LOOP START, GROUND START and STATION MODES.

When the page is terminated, the host PBX circuit removes ground from port terminal 401 of jack J4, which causes the logical state of DL_DET terminal 406 to be deasserted low, advising the processor 200 of the end of the call. Processor 200 responds by placing the audio signal multiplexers in a coupling mode for the talk-back path, so as to provide a low impedance path to hybrid duplexer circuit 84 in the idle condition.

INPUT TYPE TWO (FOURTH HIGHEST PRIORITY)

In the present example of priority level assignment, the fourth highest priority of access to the paging system served by the controller is given to an input type two access. Just as with input type one access, an input type two access is associated with one or more zone inputs ZONEi_IN, which are coupled to respective output terminals of one or more zone switches, whose operation will cause the controller to initiate paging operations which the user has predetermined to be given preference only after any pending attendant access request, input type one and telephone interface access requests have been serviced.

Except for priority assignment, all aspects of an input type two access are identical to an input type one access described above, with the paging functionality being user-defined as a customized feature programmed by the user, both for the input/output device and the effect of its operation. Namely, the action taken by control processor 200 in response to an asserted ZONEiIN logic level of input type two is in accordance with a preprogrammed response routine stored in memory and involves the assertion of one or more ZONEi_OUT signals to one or more data inputs of multi-port latching output driver unit 171.

Thus, as in the case of an input type one access, for an input type two access, a zone switch input may be employed to instruct processor 200 to output prescribed alerting tone signals, which are coupled to a specified one or more of output zone ports, as directed by zone outputs ZONE1OUT–ZONE7OUT, so that the input type one-initiated alerting tone may be coupled to one or more specified amplified speakers or a specified group of speakers. Again, the zone inputs may also be used to instruct the processor to assert an output on one or more of the switch units 300 to controllably activate a zone utility device, such as a warning strobe light or prerecorded visual and/or message the operation of which is responsive to the closure of the zone switch contacts.

Again, through programming, the processor may transmit a preprogrammed (audio/visual) page signalling protocol to one or more virtual digital port addresses distributed on an associated data communications bus. As explained previously, any audio/visual output device addressed either individually or globally by this protocol will respond by generating a prescribed audio/visual message.

Upon completing the servicing of an input type two access request, processor 200 continues to poll the respective inputs of multi-port input driver 173. As long as there is no overriding attendant access request, input type one access request, or telephone interface access request, then whenever an input type two request is asserted active, it will be serviced in the manner described above. Should the controller be occupied servicing a lower priority request at the time of an input type two access, the controller terminates that previous service request and grants immediate access to the input type two access.

NIGHT BELL (LOWEST PRIORITY)

The night bell access input corresponds to a telephone ringing voltage applied to ports 801 and 802 of a night bell port 800, to which the ring sensing circuit portion 804 of a ring detect opto-isolator 806 are coupled. The (NIGHT BELL) output of opto-isolator 806 is coupled over link 817 to input port P33 of processor 200. Opto-isolator 806 is operative to provide an active ringing signal supplied by an accessing night bell telephone circuit. In the absence of any higher priority access input, the controller will service a night bell request in accordance with one or more of the programming options employed for each of the other access requests stored in processor memory, described above.

AUXILIARY SERIAL DATA COMMUNICATIONS

As described above, via a serial data communications bus interface, shown in FIG. 6B as an RS-232 interface unit 810, containing a transmit driver 811 and a receive driver 812, processor 200 may transmit a preprogrammed (audio/visual) page signalling protocol to one or more virtual digital port addresses distributed on an associated data communications bus 809. Transmit and receive portions of the bus are respectively coupled to pins 821 and 822 of a serial communications jack J7, to which serial interface unit leads 813 and 814 are connected. Interface drivers 811 and 812 are coupled via respective transmit and receive links 815 and 816 to processor ports P31 and P30, respectively. As pointed out previously, any device, such as a silent radio shown diagrammatically at 830, and addressed either individually or globally by a protocol on the serial bus 809 connected to serial bus jack J7, will respond by generating a prescribed audio/visual message.

VIRTUAL/PHANTOM ZONES

The provision of a serial data communications bus port gives the controller the capability of sending a prescribed protocol message to one or more audio/visual devices distributed along the bus. In response to this message, any addressed device is operative to generate a prerecorded message, as described above. Because protocol activity along the serial data communications bus is digitally sourced from processor 200, the actual presence of an output device is not required to exercise this option. Where a protocol message is transmitted from processor 200 over the serial data bus in response to one of the access inputs described above, any device coupled to the bus whose address corresponds to that identified by the sourcing message will respond. If not, no message is generated for the addressed destination. This option permits one or more output devices (in particular visual display unit, such as a silent radio alpha numeric display board) to respond to such a protocol message. The output device addresses are therefore virtual rather than physical addresses, such a paging zones associated with paging zones ZONE1–ZONE8, described previously, to which latching driver 171 is ported. To provide for multiple output responses to the same protocol message from processor 200, a plurality of output devices may be given the same virtual destination address, regardless whether such a zone exists.

ZONE MAPPING

As pointed out above, when a paging zone is accessed from a calling party, e.g. telephone interface access, by the generation of DTMF tones having a numerical code identity corresponding to a respective zone, the calling party must have knowledge of the zone number. In a facility such as a factory or office building the need to have knowledge of zone numbers can be eliminated by the storing in memory a zone map (look-up table) which translates a multiple digit code (e.g. a three or four extension code or a four digit direct dial code) into the zone number in which the called party's telephone set is located. Thus, for example, if a called party's extension is 1234, rather than having to look up a particular zone number, such as zone 07, for example, the calling party accessing the paging system through the telephone interface simply dials the party's extension 1234 as the zone number. Processor 200 accesses the translating zone map in memory and outputs paging signals to the appropriate zone in which the called party (ext 1234) is located. Thus, in an office environment, where plural office personnel are located in a given zone, the extension numbers of their respective desk phones are mapped to the same zone number of their shared zone. The calling party needs only know the extension number of the desk phone to effect a page.

Figure 8A:
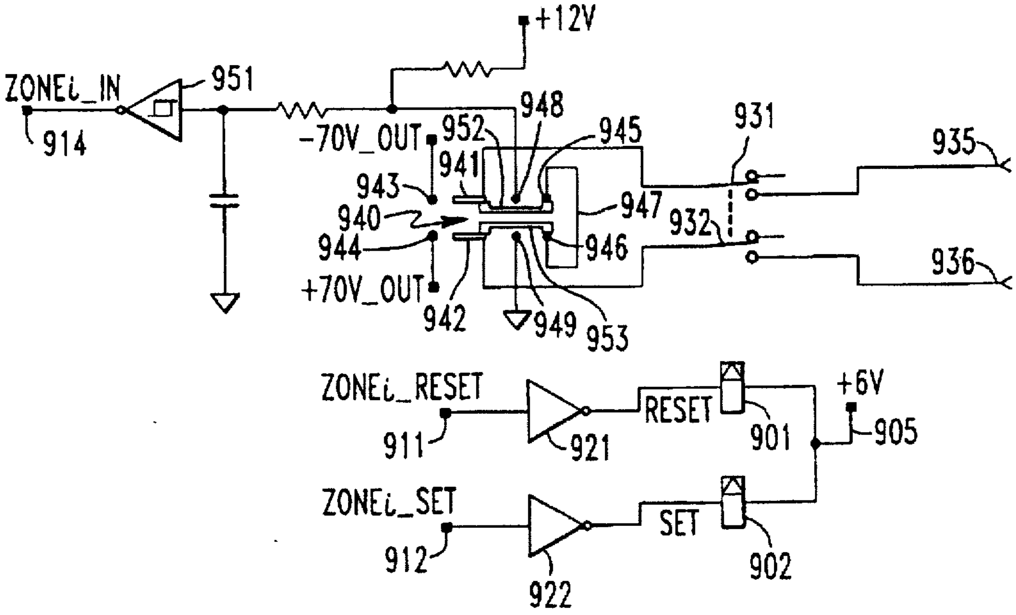
FIG. 8A schematically illustrates the circuit configuration of a programmable zone expansion switch unit.

ZONE EXPANSION UNIT (FIGS. 8 and 8A)

Although the embodiment of the invention illustrated in FIGS. 4A–7 is configured for eight zones, it should be observed that the invention is not limited to this or any particular number. Where eight bit latches and associated zone switch units (300, shown in FIG. 7) are employed, as in the illustrated embodiment, expansion to a larger number of zones is readily accomplished by connecting additional multiple zone switch units (an individual one of which is shown in FIG. 8A, to be described below) connected in a daisy-chain configuration by means of one or more zone expansion units coupled to the $I^2C$ bus 200B. As a non-limiting example, a respective zone expansion unit, diagrammatically illustrated in FIG. 8B, may be coupled to sixteen zone switches per unit in a daisy-chain interconnect configuration.

With a zone expansion unit add-on, the processor accesses each additional zone using the $I^2C$ bus. To conserve power, each zone expansion switch unit, a respective one of which is shown at 900 in FIG. 8A, employs a pair of latching relays 901, 902 in place of the individual relay 307 of the zone switch unit of FIG. 7, described above.

Figure 8B:
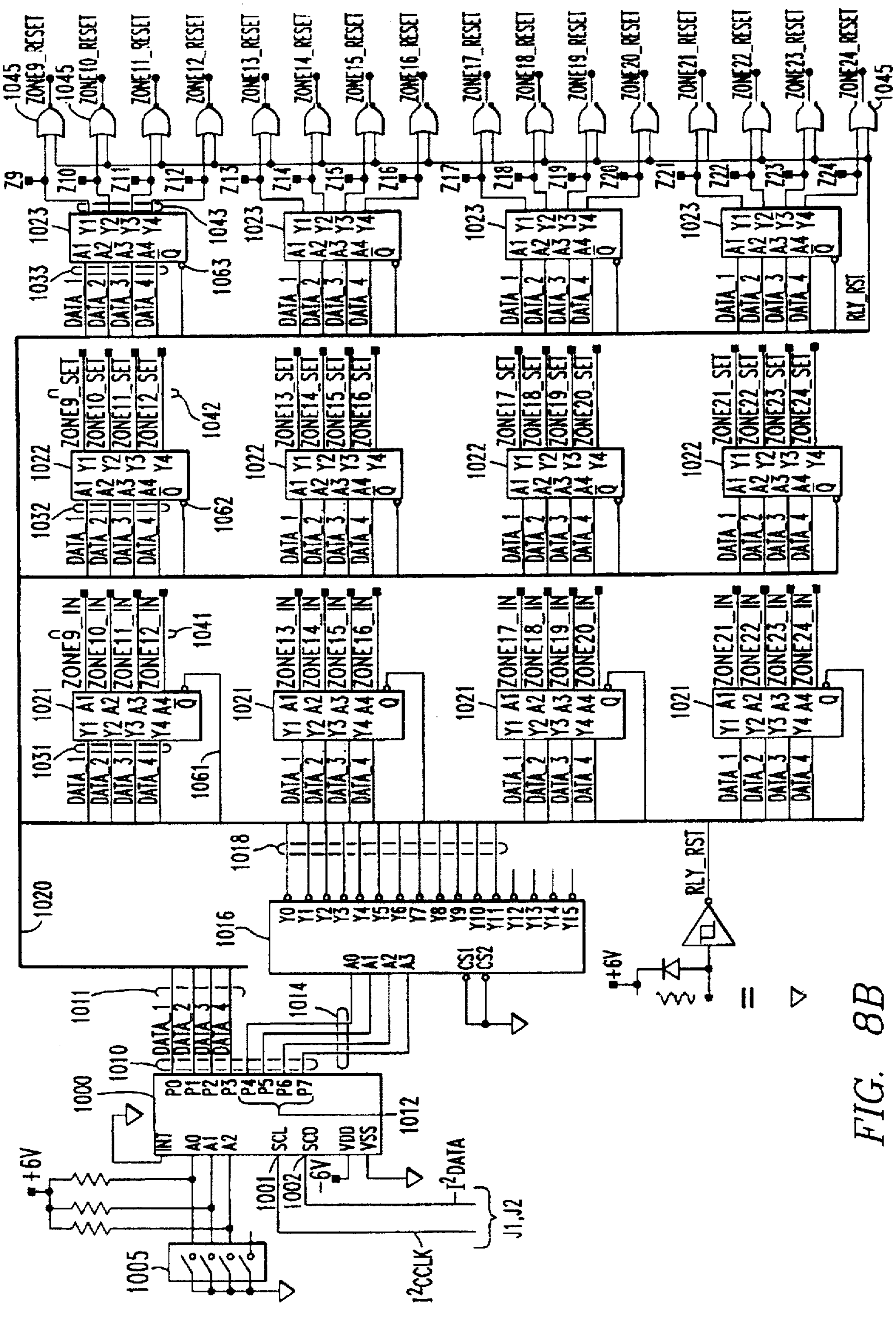
FIG. 8B diagrammatically illustrates a respective zone expansion unit.

As a non-limiting example, a respective zone expansion unit shown in FIG. 8B may employ a remote eight-bit input/output expander for $I^2C$ bus (e.g. one of models PCF8574/PCF8574A, manufactured by Signetics Corp.). As shown in FIG. 8B, the respective clock and data portions $I^2C$ bus 200B, coupled from zone expansion jacks J1, J2, are coupled to respective clock and data ports 1001 and 1002 of a remote eight-bit input/output expander 1000. The address of expander 1000 is defined in accordance with the settings of an associated set of DIP switches 1005. The four most significant bits (MSBs) 1011 of eight bit input/output ports 1010 of expander 1000 are coupled to a data bus 1020, to which are coupled one or more data input drivers 1021, zone switch 'set' output drivers 1022 and zone switch 'reset' output drivers 1023.

In the present example, each data input driver 1021 has a set of four data output ports 1031 coupled to the four respective MSB portions of data bus 1020, and four data input ports 1041 coupled to respective ZONE_IN terminals 914 of four of the zone switches of FIG. 8A, to be described. Each data output driver 1022 has a set of four data input ports 1032 coupled to the four respective MSB portions of data bus 1020, and four zone set output ports 1042 coupled to respective ZONE_SET terminals 912 of four of the zone switches of FIG. 8A. Similarly, each data output driver 1023 has a set of four data input ports 1033 coupled to the four respective MSB portions of data bus 1020, and four zone reset output ports 1043 coupled through gate circuits 1045 to respective ZONE_RESET terminals 911 of four of the zone switches of FIG. 8A.

The four least significant bits (LSBs) 1012 of the eight bit input/output ports 1010 of expander 1000 are coupled to an address decoder bus 1014, to which an address decoder 1016 is coupled. Address decoder 1016 has respective outputs coupled via decoder output bus 1018 to enable ports 1061, 1062, 1063 of driver units 1021, 1022, 1023, respectively.

Each zone expansion switch unit 900 is shown in FIG. 8A as comprising a pair of input control ports 911, 912 to which zone reset (ZONEI_RESET) and zone set (ZONEI_SET) outputs 1042, 1043 of associated driver units 1023, 1022 of FIG. 8B are respectively coupled. Each switch unit 900 also has a ZONEi_IN port 914, to which a respective input 1041 of a driver unit 1021 is coupled. Respective zone reset and zone set ports 911, 912 are coupled to relay drivers 921, 922, the respective outputs of which are coupled in circuit with latching relay windings 901, 902 and voltage terminal 905.

When the logic state of an input control port (911=ZONEi_RESET, 912=ZONEi_SET) is asserted high via the $I^2C$ bus, the output of the corresponding relay driver goes low, thereby energizing one of relay windings 901, 902, and switching a pair of normally open relay contacts 931, 932, to their closed positions, to which a pair of switching unit zone connection terminals 935, 936 are connected.

The common connections of contacts 931 and 932 are coupled to respective ones of first switch terminals 941 and 942 of a user-presettable switch 940. Presettable switch 940 further includes second switch terminals 943 and 944 respectively coupled to receive voltages for driving the speaker amplifiers (e.g. +70 VAC and −70 VADC). A further pair of switch terminals 945 and 946 is shorted together via a bridge link 947. An additional pair of terminals 948, 949 are coupled to an input driver 951 and ground potential, as shown. A pair of ganged sliding contacts 952 and 953 is arranged to be slidably positioned among the respective switch contact pairs, so as to enable the switch unit to provide an input state and first and second output states.

Thus, in the position shown, in response to the assertion of one of a ZONE_RESET or ZONEi_SET active state to a respective one of input control terminals 911, 912, thereby energizing one of latching relay windings 901, 902, the zone expansion switch unit 900 is operative to provide a circuit path loop connection through bridge connection 947, contact pair 945, 946, sliding contacts 952, 953, terminals 941, 942, closed switch contacts 931 and 933 and terminals 935, 936. Namely, in the illustrated position of sliding contacts 952, 953, the zone expansion switch unit 900 is used to provide a closed circuit path connection to an output device whose terminals are coupled to zone terminals 935, 936. This enables the zone expansion switch unit 900 to be effectively employed as an on/off switch for an audio or video device, such as the activating of a prerecorded announcement playback device through one or more paging speakers, or the activation of visual display playback unit to drive a message display device, such as a silent radio, as described above.

When sliding contacts 952, 953 are moved two positions to the left, so that sliding contact 952 connects terminals 941 and 943, and sliding 953 connects terminals 942 and 944, then, in response to the assertion of one of A ZONEi_RESET, ZONEi_SET active state to one of input control terminals 911, 912, thereby energizing one of relay windings 901, 902, the zone expansion switch unit 900 is operative to provide +/−70 VADC circuit path connections from contact pair 943, 944 sliding contacts 952, 953, terminals 941, 942, closed switch contacts 931 and 932 and terminals 935, 936, for driving associated speaker amplifiers to zone expansion which terminals 935 and 936 are connected.

When the sliding contacts 952, 953 are moved one position to the left from the position shown in FIG. 8A, so that sliding contact 951 connects terminals 941 and 948, and sliding 952 connects terminals 942 and 949, then the zone expansion switch 900 is operative as an input device in accordance with the connection state of terminals 941 and 942. When an external contact closure (e.g. the operation of a push-button switch connected across terminals 935 and 936) is operative to bridge zone terminals 935 and 936, a circuit path is established between switch terminals 948 and 949, thereby asserting a low (ground) at the input to driver 951, causing its output ZONEi_IN at terminal 914 to change state (be asserted active high). This active high assertion on ZONEi_IN terminal 914 is read by processor 200 in the course of its periodic polling of the zone inputs of the zone expansion unit via its $I^2C$ bus.

As will be appreciated from the foregoing description, the inability of conventional paging systems to provide either adequate normal paging or emergency information to the variety of individuals including visual messaging for either standard or emergency page announcements for the hearing-impaired, or audible page announcements for the visually impaired, is overcome by the paging control system of the present invention, which is configured to be accessible from a plurality of input devices, such as an attendant's position, a telephone interface, telephone night bell, programmable switch devices and digital data communications devices, and is user-programmable to respond to signalling activity sourced from such accessing devices to establish a paging connection to and perform prescribed audio/visual output paging signal functions with respect to one or a plurality of paging zones served by the system. As described above, such output paging signal functions include, but are not limited to, the transmission of audio tone and voice paging signals via an audio signal path from a paging source to one or more (controllably energized) paging loudspeaker amplifiers, the generation of one or more alert tones to a paging zone, talkback audio signalling from the paging zone to a telephone interface, the playback of prerecorded (audio/visual) messages from either or both of audio output (e.g. loudspeaker) and visual output (e.g. silent radio) devices.

While we have shown and described several embodiments in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed:

1. A paging system control apparatus comprising:

a plurality of input ports to which paging access input signals from plural types of input devices are supplied;

a plurality of output ports from which paging output signals may be supplied to plural types of paging output devices;

an audio signal interface circuit coupled to selected ones of said input ports and being operative to condition audio paging signals for application to audio paging output devices coupled to selected ones of said plurality of output ports, and being operative to couple audio/tone signals to one of said plurality of input ports; and a processor-based control unit coupled to said audio signal interface circuit and selected ones of said input and output ports, and being operative to enable prescribed types of paging signals to be delivered to said output ports in accordance with paging access input signals supplied to said input ports, and further including a plurality of user-programmable zone switch units, a respective user-programmable zone switch unit having an input/output port the function of which is user-programmable as either an input port or an output port, and wherein a respective user-programmable zone switch unit has a plurality of switch contacts which are selectively connectable with respect to said input/output port so as to provide an input signal path to said control unit, or an output connectivity path for a paging output device, said output connectivity path being controllably effected in accordance with a control signal supplied from said control unit.

2. A paging system control apparatus according to claim 1, wherein a respective user-programmable zone switch unit has a plurality of switch contacts which are selectively connectable with respect to said input/output port so as to provide an output connectivity path for an audio paging output device, said connectivity path being controllably effected in accordance with a control signal supplied from said control unit, to initiate playback of an audio message from said audio paging output device.

3. A paging system control apparatus according to claim 1, wherein a respective user-programmable zone switch unit has a plurality of switch contacts which are selectively connectable with respect to said input/output port, so as to provide an output connectivity path for a visual paging output device, said connectivity path being controllably effected in accordance with a control signal supplied from said control unit, to initiate playback of a visual message from said visual paging output device.

4. A paging system control apparatus comprising:

a plurality of input ports to which paging access input signals from plural types of input devices are supplied;

a plurality of output ports from which paging output signals may be supplied to plural types of paging output devices;

an audio signal interface circuit coupled to selected ones of said input ports and being operative to condition audio paging signals for application to audio paging output devices coupled to selected ones of said plurality of output ports, and being operative to couple audio/tone signals to one of said plurality of input ports; and a processor-based control unit coupled to said audio signal interface circuit and selected ones of said input and output ports, and being operative to enable prescribed types of paging signals to be delivered to said output ports in accordance with paging access input signals supplied to said input ports, and wherein said plurality of input ports are coupled to receive paging access input signals from an attendant's position, a telephone interface, programmable switch devices and a digital data communications device, and wherein said control unit is operative to respond to said paging access signals and to establish a paging connection to and perform prescribed audio/visual output paging signal functions with respect to plural types of paging output devices associated with one or more paging zones.

5. A paging system control apparatus according to claim 4, wherein said prescribed audio/visual output paging signal functions include the transmission of audio tone and voice paging signals via a direct audio path from a paging source to one or more paging loudspeakers, the generation of one or more alert tones to a paging zone, talkback audio signalling from a paging zone to a telephone interface, and the playback of prerecorded audio/visual messages from either or both of audio output and visual output devices.

6. A paging system control apparatus comprising:

a plurality of input ports to which paging access input signals from plural types of input devices are supplied;

a plurality of output ports from which paging output signals may be supplied to plural types of paging output devices;

an audio signal interface circuit coupled to selected ones of said input ports and being operative to condition audio paging signals for application to audio paging output devices coupled to selected ones of said plurality of output ports, and being operative to couple audio/tone signals to one of said plurality of input ports; and a processor-based control unit coupled to said audio signal interface circuit and selected ones of said input and output ports, and being operative to enable prescribed types of paging signals to be delivered to said output ports in accordance with paging access input signals supplied to said input ports, and wherein respective ones of said plurality of input ports to which paging access input signals from plural types of input devices are supplied have respectively different priorities of access permission, and wherein said control unit is operative to give access preference to a higher priority access input signal over a lower priority access input.

7. A paging system control apparatus according to claim 6, wherein said control unit includes a user-programmable access priority table containing a priority assignment list associating respectively different access priority levels to respectively different types of access input signals.

8. A paging system control apparatus comprising:

a plurality of input ports to which paging access input signals from plural types of input devices are supplied;

a plurality of output ports from which paging output signals may be supplied to plural types of paging output devices;

an audio signal interface circuit coupled to selected ones of said input ports and being operative to condition audio paging signals for application to audio paging output devices coupled to selected ones of said plurality of output ports, and being operative to couple audio/tone signals to one of said plurality of input ports; and a processor-based control unit coupled to said audio signal interface circuit and selected ones of said input and output ports, and being operative to enable prescribed types of paging signals to be delivered to said output ports in accordance with paging access input signals supplied to said input ports, and wherein said control unit has a digital data communications port, through which digitally formatted paging control output signals may be addressably supplied to one or more digitally responsive paging devices.

9. A paging system control apparatus according to claim 7, wherein said digitally responsive paging devices include visual message display devices which are operative to generate visual messages in response to receiving a digitally formatted paging control output signal by way of a digital communications link coupled to the digital data communications port of said control unit.

10. A paging system control apparatus comprising:

a plurality of input ports to which paging access input signals from plural types of input devices are supplied;

a plurality of output ports from which paging output signals may be supplied to plural types of paging output devices;

an audio signal interface circuit coupled to selected ones of said input ports and being operative to condition audio paging signals for application to audio paging output devices coupled to selected ones of said plurality of output ports, and being operative to couple audio/tone signals to one of said plurality of input ports; and a processor-based control unit coupled to said audio signal interface circuit and selected ones of said input and output ports, and being operative to enable prescribed types of paging signals to be delivered to said output ports in accordance with paging access input signals supplied to said input ports, and wherein said control unit has a digital data communications port, which is coupled to a digital data communications bus to which respectively addressable paging devices may be coupled, and wherein said control unit is operative to generate one or more virtual paging addresses, respectively associated with potentially available destination paging output devices, regardless of whether or not paging output devices are physically coupled with said digital data communications bus.

11. A paging system control apparatus comprising:

a plurality of input ports to which paging access input signals from plural types of input devices are supplied;

a plurality of output ports from which paging output signals may be supplied to plural types of paging output devices;

an audio signal interface circuit coupled to selected ones of said input ports and being operative to condition audio paging signals for application to audio paging output devices coupled to selected ones of said plurality of output ports, and being operative to couple audio/tone signals to one of said plurality of input ports; and a processor-based control unit coupled to said audio signal interface circuit and selected ones of said input and output ports, and being operative to enable prescribed types of paging signals to be delivered to said output ports in accordance with paging access input signals supplied to said input ports, and further including a power interface unit which is operative to convert voltage outputs provided by an attendant subsystem to voltages required by said audio signal interface circuit and said control unit.

12. A paging system control apparatus comprising:

a plurality of input ports to which paging access input signals from plural types of input devices are supplied;

a plurality of output ports from which paging output signals may be supplied to plural types of paging output devices;

an audio signal interface circuit coupled to selected ones of said input ports and being operative to condition audio paging signals for application to audio paging output devices coupled to selected ones of said plurality of output ports, and being operative to couple audio/tone signals to one of said plurality of input ports; and a processor-based control unit coupled to said audio signal interface circuit and selected ones of said input and output ports, and being operative to enable prescribed types of paging signals to be delivered to said output ports in accordance with paging access input signals supplied to said input ports, and wherein one of said plurality of input ports is coupled to receive audio voice and tone signals from an attendant's position, and wherein said control unit is operative to cause said audio signal interface circuit to provide a paging signal path therethrough to one or more of said output ports in response to a paging access input signal sourced from said attendant's position.

13. A paging system control apparatus comprising:

a plurality of input ports to which paging access input signals from plural types of input devices are supplied;

a plurality of output ports from which paging output signals may be supplied to plural types of paging output devices;

an audio signal interface circuit coupled to selected ones of said input ports and being operative to condition audio paging signals for application to audio paging output devices coupled to selected ones of said plurality of output ports, and being operative to couple audio/tone signals to one of said plurality of input ports; and a processor-based control unit coupled to said audio signal interface circuit and selected ones of said input and output ports, and being operative to enable prescribed types of paging signals to be delivered to said output ports in accordance with paging access input signals supplied to said input ports, and wherein one of said plurality of input ports is coupled to receive audio voice and tone signals from a telephone interface, and wherein said audio signal interface circuit is operative to couple audio paging signals sourced from said telephone interface to one or more of said plurality of output ports for application to one or more paging speakers.

14. A paging system control apparatus according to claim 13, wherein said audio signal interface circuit is operative to provide a paging signal path therethrough to one or more of said output ports in response to a paging access input signal sourced from any of a loop start telephone interface, a ground start telephone interface, a station mode telephone interface, and a dry loop telephone interface.

15. A paging system control apparatus according to claim 13, wherein said audio signal interface circuit includes a page/talkback path coupled in circuit with said telephone interface, and includes a page/talkback detection circuit which is operative to enable the transmission of either page signals sourced from said telephone interface, or talkback signals sourced from a paging zone audio signal transducer coupled to an output port, in dependence upon the audio background of the paging zone containing said paging zone audio transducer.

16. A paging system control apparatus according to claim 15, wherein said page/talkback detection circuit includes a variable threshold comparator circuit which is operative to compare an audio signal path level representative of paging activity from said telephone interface with an adaptive paging zone background-representative threshold value, and generates a page detection output signal representative of whether or not the signal level of the audio signal path exceeds said paging zone background-representative threshold, and wherein said control unit is operative to enable the transmission over said page/talkback path of either page signals sourced from said telephone interface, or talkback signals sourced from a paging zone audio signal transducer coupled to an output port, in accordance with said page detection output signal.

17. A paging system control apparatus according to claim 16, wherein said audio signal interface circuit includes a first precision rectifier circuit coupled in an audio signal path from said telephone interface, and a second precision rectifier circuit coupled in a talkback path from said output port to said telephone interface, and wherein said page/talkback detection circuit has first and second inputs coupled in circuit with said first and second precision rectifier circuits, respectively.

18. A paging system control apparatus according to claim 16, wherein said audio signal interface circuit includes a filter circuit which is operative to prevent talkback signals which are coupled via said page/talkback path to said telephone interface from being coupled through an audio signal path to an output port.

19. A paging system control apparatus according to claim 18, wherein said filter circuit is operative to prevent prescribed tone signals which are coupled via said page/talkback path to said telephone interface from being coupled through an audio signal path to said output port.

20. A paging system control apparatus comprising:

a plurality of input ports to which paging access input signals from plural types of input devices are supplied;

a plurality of output ports from which paging output signals may be supplied to plural types of paging output devices;

an audio signal interface circuit coupled to selected ones of said input ports and being operative to condition audio paging signals for application to audio paging output devices coupled to selected ones of said plurality of output ports, and being operative to couple audio/tone signals to one of said plurality of input ports; and a processor-based control unit coupled to said audio signal interface circuit and selected ones of said input and output ports, and being operative to enable prescribed types of paging signals to be delivered to said output ports in accordance with paging access input signals supplied to said input ports, and wherein said control unit includes a dual tone multifrequency signal decoder, and a supervisory control processor which is operative to monitor outputs of said dual tone multifrequency signal decoder for paging zone identification.

21. A paging system control apparatus comprising:

a plurality of input ports to which paging access input signals from plural types of input devices are supplied;

a plurality of output ports from which paging output signals may be supplied to plural types of paging output devices;

an audio signal interface circuit coupled to selected ones of said input ports and being operative to condition audio paging signals for application to audio paging output devices coupled to selected ones of said plurality of output ports, and being operative to couple audio/tone signals to one of said plurality of input ports; and a processor-based control unit coupled to said audio signal interface circuit and selected ones of said input and output ports, and being operative to enable prescribed types of paging signals to be delivered to said output ports in accordance with paging access input signals supplied to said input ports, and wherein said control unit includes a supervisory control processor which is coupled to said output ports via multi-port latching output driver units, and which is coupled to said input ports via respective data outputs of a multiport input buffer driver unit.

22. A paging system control apparatus according to claim 21, wherein said multi-port latching output driver units include zone-associated output ports coupled to respective relay driver inputs of presettable zone switch units, and output ports which provide respective control signals for controlling the operation of said audio signal interface.

23. A paging system control apparatus according to claim 22, wherein a respective presettable zone switch unit is user programmable to couple power to a zone speaker amplifier, or operate as a (switch closure-defined) input/output device.

24. A paging system control apparatus according to claim 4, wherein one of said plurality of input ports is coupled to receive paging access ringing signals from a night bell.

25. A paging system control apparatus comprising:

a plurality of input ports to which paging access input signals from plural types of input devices are supplied;

a plurality of output ports from which paging output signals may be supplied to plural types of paging output devices;

an audio signal interface circuit coupled to selected ones of said input ports and being operative to condition audio paging signals for application to audio paging output devices coupled to selected ones of said plurality of output ports, and being operative to couple audio/tone signals to one of said plurality of input ports; and a processor-based control unit coupled to said audio signal interface circuit and selected ones of said input and output ports, and being operative to enable prescribed types of paging signals to be delivered to said output ports in accordance with paging access input signals supplied to said input ports, and wherein said plurality of output ports are associated with paging zones served by said paging system, and wherein said control unit includes a look-up table through which a prescribed code other than a paging zone identifier, and sourced by a paging source coupled to said audio signal interface is mapped into said paging zone identifier associated with an output port by way of which paging output signals are supplied to a paging output devices.

26. A paging system control apparatus comprising:

a plurality of input ports to which paging access input signals from plural types of input devices are supplied;

a plurality of output ports from which paging output signals may be supplied to plural types of paging output devices;

an audio signal interface circuit coupled to selected ones of said input ports and being operative to condition audio paging signals for application to audio paging output devices coupled to selected ones of said plurality of output ports, and being operative to couple audio/tone signals to one of said plurality of input ports; and a processor-based control unit coupled to said audio signal interface circuit and selected ones of said input and output ports, and being operative to enable prescribed types of paging signals to be delivered to said output ports in accordance with paging access input signals supplied to said input ports, and wherein said control unit includes a digital communications bus, and further including a zone expansion unit coupled to said digital communications bus, said zone expansion unit having a plurality of programmable input/output ports coupled to said digital communications bus and through which the number of paging zones served by said paging system may be expanded to a number in excess of said plurality of output ports.

27. A paging system control apparatus according to claim 26, wherein said digital communications bus comprises an $I^2C$ bus, having respective data and clock portions, which are operative to interface processor-sourced digital signalling clock and digital data signals with addressed ones of said programmable input/output ports.

28. A paging system control apparatus for controlling the operation of paging system, said paging system including paging signal amplifier devices and paging signal output devices coupled thereto, said paging system control apparatus comprising:

a multi-port input/output unit, each of respective ports of which is individually programmably configurable as one of an input port, a first connectivity type output port, and a second connectivity type output port;

an audio signal interface circuit having an attendant input port coupled to receive page/tone input signals from an attendant position and a telephone interface port coupled to receive page/tone input signals from a telephone circuit, and being operative to condition paging signals received from a selected one of said attendant input port and said telephone interface port for application to at least one audio output port to which a paging signal amplifier device of said paging system may be coupled; and a processor-based control unit coupled to said audio signal interface circuit and said multi-port input/output unit, and being operative to cause at least one selected port of said multi-port input/output unit, which port has been programmably configured as a first connectivity type output port, to supply an enabling electrical stimulus to at least one paging signal amplifier device to which said at least one audio output port is coupled, whereby said conditioned paging signals are amplified by said paging signal amplifier device and output as paging output signals by a paging output device coupled thereto, and wherein said multi-port input/output unit comprises a plurality of user-programmable zone switch units, a respective user-programmable zone switch unit having an input/output port the function of which is user-programmable as either an input port, said first connectivity type output port, or said second connectivity type output port, and wherein a respective user-programmable zone switch unit has a plurality of switch contacts which are selectively connectable with respect to said input/output port so as to provide an input signal path to said processor-based control unit, a first output connectivity path for application of said prescribed electrical stimulus to a paging signal amplifier device, or a second output connectivity path for a paging output device, and wherein said first output connectivity path and said second output connectivity path are controllably effected in accordance with a control signal supplied from said processor-based control unit.

29. A paging system control apparatus according to claim 28, wherein said second output connectivity path for a paging output device is controllably effected in accordance with a control signal supplied from said control unit so as to initiate playback of an audio message from an audio paging output device coupled thereto.

30. A paging system control apparatus according to claim 28, wherein said second output connectivity path for a paging output device is controllably effected in accordance with a control signal supplied from said control unit so as to initiate playback of an visual message from an visual paging output device coupled thereto.

31. A paging system control apparatus, for controlling the operation of paging system, said paging system including paging signal amplifier devices and paging signal output devices coupled thereto, said paging system control apparatus comprising:

a multi-port input/output unit, each of respective ports of which is individually programmably configurable as one of an input port, a first connectivity type output port, and a second connectivity type output port;

an audio signal interface circuit having an attendant input port coupled to receive page/tone input signals from an attendant position and a telephone interface port coupled to receive page/tone input signals from a telephone circuit, and being operative to condition paging signals received from a selected one of said attendant input port and said telephone interface port for application to at least one audio output port to which a paging signal amplifier device of said paging system may be coupled; and a processor-based control unit coupled to said audio signal interface circuit and said multi-port input/output unit, and being operative to cause at least one selected port of said multi-port input/output unit, which port has been programmably configured as a first connectivity type output port, to supply an enabling electrical stimulus to at least one paging signal amplifier device to which said at least one audio output port is coupled, whereby said conditioned paging signals are amplified by said paging signal amplifier device and output as paging output signals by a paging output device coupled thereto, and wherein said processor-based control unit further includes a digital data input port coupled to receive digital paging access input signals from a digital data communications device.

32. A paging system control apparatus according to claim 28, and wherein said processor-based control unit is operative to respond to said paging access signals from any of said attendant access port, said telephone interface port, respective input ports of said multi-port input/output unit, and said digital data input port and to establish a paging connection to and perform prescribed audio or visual output paging signal functions with respect to plural types of paging output devices associated with one or more paging zones served by said paging system.

33. A paging system control apparatus for the operation of paging system, said paging system including paging signal amplifier devices and paging signal output devices coupled thereto, said paging system control apparatus comprising:

a multi-port input/output unit, each of respective ports of which is individually programmably configurable as one of an input port, a first connectivity type output port, and a second connectivity type output port;

an audio signal interface circuit having an attendant input port coupled to receive page/tone input signals from an attendant position and a telephone interface port coupled to receive page/tone input signals from a telephone circuit, and being operative to condition paging signals received from a selected one of said attendant input port and said telephone interface port for application to at least one audio output port to which a paging signal amplifier device of said paging system may be coupled; and a processor-based control unit coupled to said audio signal interface circuit and said multi-port input/output unit, and being operative to cause at least one selected port of said multi-port input/output unit, which port has been programmably configured as a first connectivity type output port, to supply an enabling electrical stimulus to at least one paging signal amplifier device to which said at least one audio output port is coupled, whereby said conditioned paging signals are amplified by said paging signal amplifier device and output as paging output signals by a paging output device coupled thereto, and wherein said audio signal interface circuit is operative to provide a talkback audio signalling path from a paging zone speaker to said telephone interface, and a tone signalling path from said processor-based control unit to said telephone interface.

34. A paging system control apparatus for the operation of paging system, said paging system including paging signal amplifier devices and paging signal output devices coupled thereto, said paging system control apparatus comprising:

a multi-port input/output unit, each of respective ports of which is individually programmably configurable as one of an input port, a first connectivity type output port, and a second connectivity type output port;

an audio signal interface circuit having an attendant input port coupled to receive page/tone input signals from an attendant position and a telephone interface port coupled to receive page/tone input signals from a telephone circuit, and being operative to condition paging signals received from a selected one of said attendant input port and said telephone interface port for application to at least one audio output port to which a paging signal amplifier device of said paging system may be coupled; and a processor-based control unit coupled to said audio signal interface circuit and said multi-port input/output unit, and being operative to cause at least one selected port of said multi-port input/output unit, which port has been programmably configured as a first connectivity type output port, to supply an enabling electrical stimulus to at least one paging signal amplifier device to which said at least one audio output port is coupled, whereby said conditioned paging signals are amplified by said paging signal amplifier device and output as paging output signals by a paging output device coupled thereto, and wherein respective ones of said plurality of input ports of said multi-port input/output unit are configured as input ports to which paging access input signals from plural input devices are supplied.

35. A paging system control apparatus for the operation of paging system, said paging system including paging signal amplifier devices and paging signal output devices coupled thereto, said paging system control apparatus comprising:

a multi-port input/output unit, each of respective ports of which is individually programmably configurable as one of an input port, a first connectivity type output port, and a second connectivity type output port;

an audio signal interface circuit having an attendant input port coupled to receive page/tone input signals from an attendant position and a telephone interface port coupled to receive page/tone input signals from a telephone circuit, and being operative to condition paging signals received from a selected one of said attendant input port and said telephone interface port for application to at least one audio output port to which a paging signal amplifier device of said paging system may be coupled; and a processor-based control unit coupled to said audio signal interface circuit and said multi-port input/output unit, and being operative to cause at least one selected port of said multi-port input/output unit, which port has been programmably configured as a first connectivity type output port, to supply an enabling electrical stimulus to at least one paging signal amplifier device to which said at least one audio output port is coupled, whereby said conditioned paging signals are amplified by said paging signal amplifier device and output as paging output signals by a paging output device coupled thereto, and wherein said processor-based control unit is operative to respond to paging access input signals from said attendant access port, said telephone interface port and input ports of said multi-port input/output device in accordance with respectively different priorities of access permission, and wherein said control unit is operative to give access preference to a higher priority access input signal over a lower priority access input.

36. A paging system control apparatus according to claim 35, wherein said processor-based control unit includes a user-programmable access priority table containing a priority assignment list associating respectively different access priority levels to respectively different types of access input signals.

37. A paging system control apparatus for the operation of paging system, said paging system including paging signal amplifier devices and paging signal output devices coupled thereto, said paging system control apparatus comprising:

a multi-port input/output unit, each of respective ports of which is individually programmably configurable as one of an input port, a first connectivity type output port, and a second connectivity type output port;

an audio signal interface circuit having an attendant input port coupled to receive page/tone input signals from an attendant position and a telephone interface port coupled to receive page/tone input signals from a telephone circuit, and being operative to condition paging signals received from a selected one of said attendant input port and said telephone interface port for application to at least one audio output port to which a paging signal amplifier device of said paging system may be coupled; and a processor-based control unit coupled to said audio signal interface circuit and said multi-port input/output unit, and being operative to cause at least one selected port of said multi-port input/output unit, which port has been programmably configured as a first connectivity type output port, to supply an enabling electrical stimulus to at least one paging signal amplifier device to which said at least one audio output port is coupled, whereby said conditioned paging signals are amplified by said paging signal amplifier device and output as paging output signals by a paging output device coupled thereto, and wherein said processor-based control unit further includes a digital data communications port, through which digitally formatted paging control output signals may be addressably supplied to one or more digitally responsive paging devices.

38. A paging system control apparatus according to claim 37, wherein said digitally responsive paging devices include visual message display devices which are operative to generate visual messages in response to receiving a digitally formatted paging control output signal by way of a digital communications link coupled to the digital data communications port of said processor-based control unit.

39. A paging system control apparatus for the operation of paging system, said paging system including paging signal amplifier devices and paging signal output devices coupled thereto, said paging system control apparatus comprising:

a multi-port input/output unit, each of respective ports of which is individually programmably configurable as one of an input port, a first connectivity type output port, and a second connectivity type output port;

an audio signal interface circuit having an attendant input port coupled to receive page/tone input signals from an attendant position and a telephone interface port coupled to receive page/tone input signals from a telephone circuit, and being operative to condition paging signals received from a selected one of said attendant input port and said telephone interface port for application to at least one audio output port to which a paging signal amplifier device of said paging system may be coupled; and a processor-based control unit coupled to said audio signal interface circuit and said multi-port input/output unit, and being operative to cause at least one selected port of said multi-port input/output unit, which port has been programmably configured as a first connectivity type output port, to supply an enabling electrical stimulus to at least one paging signal amplifier device to which said at least one audio output port is coupled, whereby said conditioned paging signals are amplified by said paging signal amplifier device and output as paging output signals by a paging output device coupled thereto, and wherein said processor-based control unit has a digital data communications port, which is coupled to a digital data communications bus to which respectively addressable paging devices may be coupled, and wherein said processor-based control unit is operative to generate one or more virtual paging addresses, respectively associated with potentially available destination paging output devices, regardless of whether or not paging output devices are physically coupled with said digital data communications bus.

40. A paging system control apparatus for the operation of paging system, said paging system including paging signal amplifier devices and paging signal output devices coupled thereto, said paging system control apparatus comprising:

a multi-port input/output unit, each of respective ports of which is individually programmably configurable as one of an input port, a first connectivity type output port, and a second connectivity type output port;

an audio signal interface circuit having an attendant input port coupled to receive page/tone input signals from an attendant position and a telephone interface port coupled to receive page/tone input signals from a telephone circuit, and being operative to condition paging signals received from a selected one of said attendant input port and said telephone interface port for application to at least one audio output port to which a paging signal amplifier device of said paging system may be coupled; and a processor-based control unit coupled to said audio signal interface circuit and said multi-port input/output unit, and being operative to cause at least one selected port of said multi-port input/output unit, which port has been programmably configured as a first connectivity type output port, to supply an enabling electrical stimulus to at least one paging signal amplifier device to which said at least one audio output port is coupled, whereby said conditioned paging signals are amplified by said paging signal amplifier device and output as paging output signals by a paging output device coupled thereto, and further including a power interface unit which is operative to convert voltage outputs provided by an attendant subsystem to voltage values required by said audio signal interface circuit and said processor-based control unit.

41. A paging system control apparatus for the operation of paging system, said paging system including paging signal amplifier devices and paging signal output devices coupled thereto, said paging system control apparatus comprising:

a multi-port input/output unit, each of respective ports of which is individually programmably configurable as one of an input port, a first connectivity type output port, and a second connectivity type output port;

an audio signal interface circuit having an attendant input port coupled to receive page/tone input signals from an attendant position and a telephone interface port coupled to receive page/tone input signals from a telephone circuit, and being operative to condition paging signals received from a selected one of said attendant input port and said telephone interface port for application to at least one audio output port to which a paging signal amplifier device of said paging system may be coupled; and a processor-based control unit coupled to said audio signal interface circuit and said multi-port input/output unit, and being operative to cause at least one selected port of said multi-port input/output unit, which port has been programmably configured as a first connectivity type output port, to supply an enabling electrical stimulus to at least one paging signal amplifier device to which said at least one audio output port is coupled, whereby said conditioned paging signals are amplified by said paging signal amplifier device and output as paging output signals by a paging output device coupled thereto, and wherein said audio signal interface circuit is operative to provide a paging signal path therethrough to said at least one audio output port to which a paging signal amplifier device of said paging system may be coupled, in response to a paging access input signal sourced from any of a loop start telephone interface, a ground start telephone interface, a station mode telephone interface, and a dry loop telephone interface.

42. A paging system control apparatus according to claim 33, wherein said page/talkback signalling path includes a page/talkback detection circuit which is operative to enable the transmission of either page signals sourced from said telephone interface, or talkback signals sourced from a paging zone audio signal transducer coupled to an audio output port, in dependence upon the audio background of the paging zone containing said paging zone audio transducer.

43. A paging system control apparatus according to claim 42, wherein said page/talkback detection circuit includes a variable threshold comparator circuit which is operative to compare an audio signal path level representative of paging activity from said telephone interface with an adaptive paging zone background-representative threshold value, and generates a page detection output signal representative of whether or not the signal level of the audio signal path exceeds said paging zone background-representative threshold, and wherein said processor-based control unit is operative to enable the transmission over said page/talkback path of either page signals sourced from said telephone interface, or talkback signals sourced from said paging zone audio signal transducer, in accordance with said page detection output signal.

44. A paging system control apparatus according to claim 43, wherein said audio signal interface circuit includes a first precision rectifier circuit coupled in an audio signal path from said telephone interface, and a second precision rectifier circuit coupled in a talkback path from said output port to said telephone interface, and wherein said page/talkback detection circuit has first and second inputs coupled in circuit with said first and second precision rectifier circuits, respectively.

45. A paging system control apparatus according to claim 43, wherein said audio signal interface circuit includes a hybrid duplexer filter circuit which is operative to prevent talkback signals which are coupled via said page/talkback path to said telephone interface from being coupled through an audio signal path to an audio output port.

46. A paging system control apparatus according to claim 45, wherein said hybrid duplexer filter circuit is operative to prevent prescribed tone signals which are coupled via said page/talkback path to said telephone interface from being coupled through an audio signal path to said audio output port.

47. A paging system control apparatus for the operation of paging system, said paging system including paging signal amplifier devices and paging signal output devices coupled thereto, said paging system control apparatus comprising:

a multi-port input/output unit, each of respective ports of which is individually programmably configurable as one of an input port, a first connectivity type output port, and a second connectivity type output port;

an audio signal interface circuit having an attendant input port coupled to receive page/tone input signals from an attendant position and a telephone interface port coupled to receive page/tone input signals from a telephone circuit, and being operative to condition paging signals received from a selected one of said attendant input port and said telephone interface port for application to at least one audio output port to which a paging signal amplifier device of said paging system may be coupled; and a processor-based control unit coupled to said audio signal interface circuit and said multi-port input/output unit, and being operative to cause at least one selected port of said multi-port input/output unit, which port has been programmably configured as a first connectivity type output port, to supply an enabling electrical stimulus to at least one paging signal amplifier device to which said at least one audio output port is coupled, whereby said conditioned paging signals are amplified by said paging signal amplifier device and output as paging output signals by a paging output device coupled thereto, and wherein plural ports of said multi-port input/output unit are associated with paging zones served by said paging system, and wherein said processor-based control unit includes a look-up table through which a prescribed code other than a paging zone identifier, and sourced by a paging source coupled to said audio signal interface, is mapped into said paging zone identifier associated with an output port of said multi-port input/output unit by way of which paging output signals are supplied to a paging output devices.

48. A paging system control apparatus for the operation of paging system, said paging system including paging signal amplifier devices and paging signal output devices coupled thereto, said paging system control apparatus comprising:

a multi-port input/output unit, each of respective ports of which is individually programmably configurable as one of an input port, a first connectivity type output port, and a second connectivity type output port;

an audio signal interface circuit having an attendant input port coupled to receive page/tone input signals from an attendant position and a telephone interface port coupled to receive page/tone input signals from a telephone circuit, and being operative to condition paging signals received from a selected one of said attendant input port and said telephone interface port for application to at least one audio output port to which a paging signal amplifier device of said paging system may be coupled; and a processor-based control unit coupled to said audio signal interface circuit and said multi-port input/output unit, and being operative to cause at least one selected port of said multi-port input/output unit, which port has been programmably configured as a first connectivity type output port, to supply an enabling electrical stimulus to at least one paging signal amplifier device to which said at least one audio output port is coupled, whereby said conditioned paging signals are amplified by said paging signal amplifier device and output as paging output signals by a paging output device coupled thereto, and wherein said processor-based control unit includes a digital communications bus, and further including a zone expansion unit coupled to said digital communications bus, said zone expansion unit having a plurality of programmable input/output ports coupled to said digital communications bus and through which the number of paging zones served by said paging system may be expanded to a number in excess of the plurality of ports of said multi-port input/output unit.

49. A paging system control apparatus according to claim 48, wherein said digital communications bus comprises an $I^2C$ bus, having respective data and clock portions, which are operative to interface processor-sourced digital signalling clock and digital data signals with addressed ones of programmable input/output ports of said zone expansion unit.

* * * * *